United States Patent
Park et al.

(10) Patent No.: US 9,632,595 B2
(45) Date of Patent: Apr. 25, 2017

(54) METHOD FOR OPERATION OF PEN FUNCTION AND ELECTRONIC DEVICE SUPPORTING THE SAME

(71) Applicant: Samsung Electronics Co., Ltd., Gyeonggi-do (KR)

(72) Inventors: Hyunmi Park, Seoul (KR); Taeyeon Kim, Seoul (KR); Saegee Oh, Gyeonggi-do (KR); Jaemyoung Lee, Seoul (KR); Jinyoung Jeon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 494 days.

(21) Appl. No.: 13/960,438

(22) Filed: Aug. 6, 2013

(65) Prior Publication Data
US 2014/0055426 A1 Feb. 27, 2014

(30) Foreign Application Priority Data
Aug. 24, 2012 (KR) .................. 10-2012-0093192

(51) Int. Cl.
*G06F 3/0354* (2013.01)
*G06F 3/0488* (2013.01)
*G06F 3/038* (2013.01)
*G06F 3/01* (2006.01)

(52) U.S. Cl.
CPC .......... *G06F 3/03545* (2013.01); *G06F 3/017* (2013.01); *G06F 3/038* (2013.01); *G06F 3/0488* (2013.01); *G06F 2203/04807* (2013.01)

(58) Field of Classification Search
CPC ............... G06F 3/0412; G06F 3/03545; G06F 3/04883; G06F 3/017
See application file for complete search history.

(56) References Cited

U.S. PATENT DOCUMENTS

| | | | |
|---|---|---|---|
| 6,842,175 B1 * | 1/2005 | Schmalstieg | G06F 3/011 345/427 |
| 6,930,672 B1 | 8/2005 | Kuribayashi | |
| 7,802,202 B2 * | 9/2010 | Fox | G06F 3/038 715/831 |
| 2002/0113778 A1 * | 8/2002 | Rekimoto | G06F 3/046 345/173 |
| 2004/0188529 A1 | 9/2004 | Kim | |

(Continued)

*Primary Examiner* — Ricardo L Osorio
(74) *Attorney, Agent, or Firm* — Cha & Reiter, LLC

(57) ABSTRACT

An apparatus and method for operation of a pen function in an electronic device. A pen recognition panel recognizes a touch pen according to a set mode. A control unit collects pen status information including at least one of information on an arrangement state between a pen recognition panel and a touch pen and a state information on whether a button of the touch pen is pushed, type information on a currently activated application program, and a gesture recognition information according to a gesture input operation of the touch pen, or collects the pen status information and the gesture recognition information. A storage unit stores a pen function table providing a pen function command corresponding to collected information according to the set mode, and a display panel displays information according to performing of a function corresponding to the pen function command.

22 Claims, 15 Drawing Sheets

(56) References Cited

U.S. PATENT DOCUMENTS

| | | |
|---|---|---|
| 2006/0253793 A1 | 11/2006 | Zhai et al. |
| 2006/0267966 A1* | 11/2006 | Grossman ............. G06F 3/0346 345/179 |
| 2008/0109751 A1* | 5/2008 | Fitzmaurice .......... G06F 3/0488 715/793 |
| 2009/0256817 A1* | 10/2009 | Perlin ................... G06F 3/0233 345/174 |
| 2010/0001968 A1 | 1/2010 | Lee |
| 2010/0021022 A1* | 1/2010 | Pittel ................... G06F 3/03545 382/123 |
| 2010/0051356 A1* | 3/2010 | Stern ................... G06F 3/03545 178/19.04 |
| 2010/0234077 A1 | 9/2010 | Yoo et al. |
| 2011/0141050 A1 | 6/2011 | Miura |
| 2011/0164001 A1 | 7/2011 | Seo et al. |
| 2011/0234492 A1 | 9/2011 | Ajmera et al. |
| 2011/0316679 A1 | 12/2011 | Pihlaja |
| 2012/0068941 A1 | 3/2012 | Arrasvuori et al. |
| 2012/0098772 A1 | 4/2012 | Eun et al. |
| 2014/0015776 A1* | 1/2014 | Kim ................... G06F 3/03545 345/173 |

* cited by examiner

FIG. 3
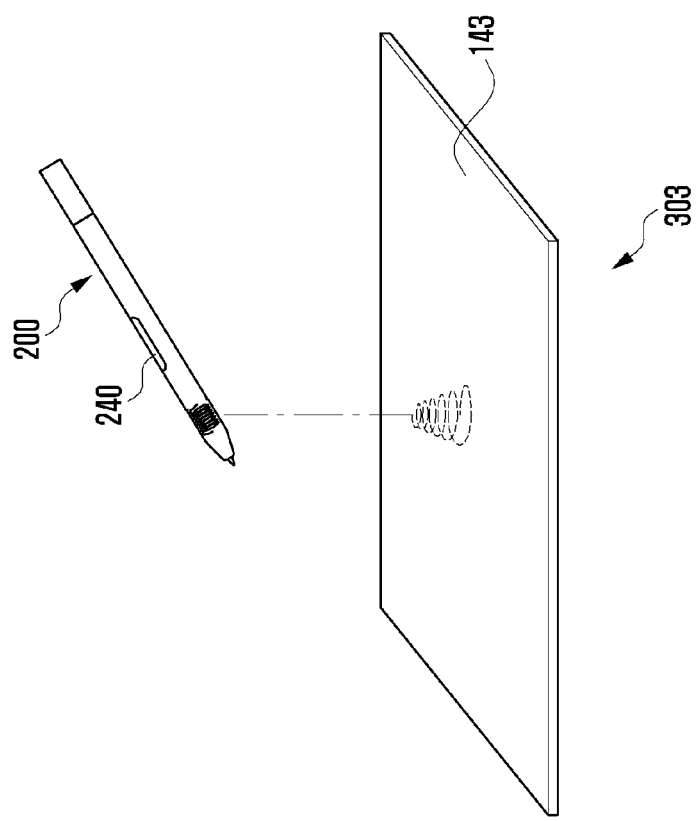
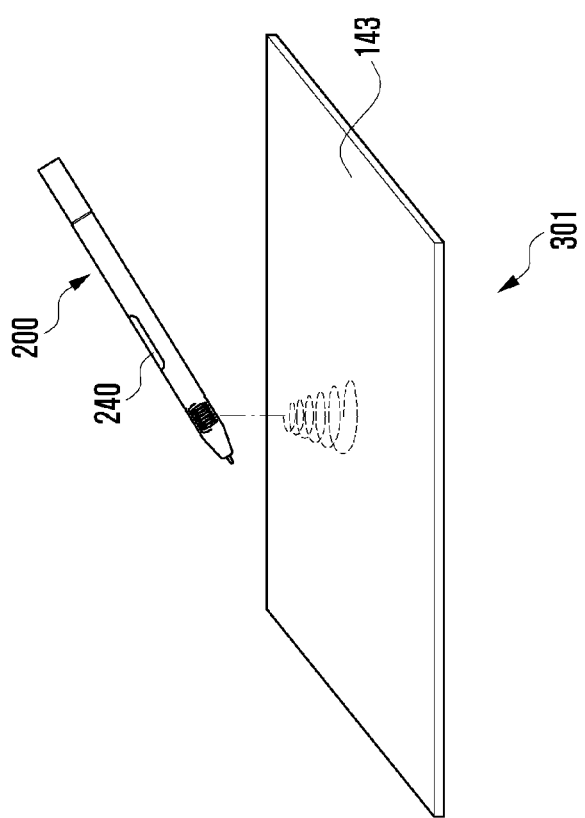

FIG. 11

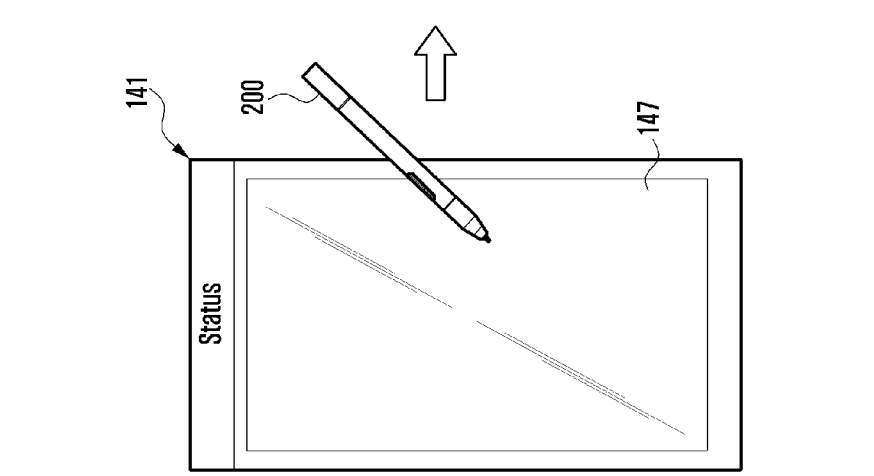

| | | | |
|---|---|---|---|
| Email | @ | + 'name' | Open email composer |
| | @ | + 'name' | Open email composer with recipient field filled |
| Search | ? | | Open Search |
| | ? | + 'keyword' | Execute search for the keyword |
| Calculator | = | + FORMULA | FORMULA CALCULATION |
| SPlanner | # | + Date / Time / Title | PARSE DATA TO GENERATE PLANNER EVENT |
| Music | △ | + Music "Play list" | "Play list" PLAYBACK |
| Messaging | ✉ | + Name | MESSAGE COMPOSITION FUNCTION BASED ON CHARACTER MESSAGE |
| Alarm | ⏰ | + Time | EXECUTE ALARM AFTER N SECONDS |
| Call | ☏ | + Name | EXECUTE DIALER TO WHICH NUMBER IS INPUT |
| eBook | 📖 | + Content title | EXECUTE EBOOKCONTENTS |
| ChatOn | 💬 | + Name | EXECUTE CHATONCOMPOSER TO WHICH RECIPIENT IS INPUT |
| Clipboard | 📎 | | EXECUTE CLIPBOARD |
| Contacts favorites | ✩ | | EXECUTE CONTACTFAVORITES LIST |

METHOD FOR OPERATION OF PEN FUNCTION AND ELECTRONIC DEVICE SUPPORTING THE SAME

CLAIM OF PRIORITY

This application claims the benefit under 35 U.S.C. §119(a) from a Korean patent application filed on Aug. 24, 2012 in the Korean Intellectual Property Office and assigned Serial No. 10-2012-0093192, the entire disclosure of which is hereby incorporated by reference in its entirety.

BACKGROUND

Field of the Invention

The present disclosure relates to operation of a pen function in an electronic device. More particularly, the present disclosure relates to a method for operation of a pen function and an electronic device supporting the same for various user functions of electronic devices that include handheld and portable electronic devices.

Description of the Related Art

With the advantages of functionality while being mobile, electronic devices such as mobile terminals are now in widespread use. More particularly, a portable electronic devices such as mobile terminals, tablets, and phablets or smartphones that enable a voice communication while being in motion have become increasingly popular. Recently, mobile terminals have been designed to support various functions such as a file playback function, file search function, and file edit function as well as a communication function. The user can enjoy various functions provided by the mobile terminal.

Typically, the mobile terminal is limited in size for convenience of portability and use while being in mobile, and thus the mobile terminal has a small display area as compared to a TV monitor. There is a disadvantage in the small display area of a mobile terminal in that it is difficult to perform various user inputs when doing so on such a small display unit. To overcome this problem, an input device is sometimes provided in conventional devices, such as a stylus pen or capability to detect various touches of user digits that can be associated with various functions. With a pen input, the user can manipulate contact with more detail than with digits because of the relatively smaller tip of a pen stylus versus, for example, a finger. However, the stylus pen is rarely used except in special cases because many functions of the mobile terminal can often be controlled by fingers, and the additional tasks of carrying and removing a stylus pen from a storage area of a mobile terminal is relatively cumbersome, and then the stylus pen needs to be put away. Therefore, a conventional stylus pen input is typically used to touch a specific area output on a display unit. Accordingly, there is a trend for requirements for operation of various functions of a terminal based on a stylus pen input.

SUMMARY

The present invention has been made in an effort to address at least the above problem and provides a method for operation of a pen function and an electronic device supporting the same that can support various function operations based on a pen input.

The present invention provides a configuration of an electronic device for supporting a pen function operation including a pen recognition panel that collects a key command input through a gesture input operation using a touch pen to activate a specific function, and provides for a function support information input along with the gesture input operation of the touch pen that is applied to the function activated by the key command; and a control unit that activates the function corresponding to the key command, and controls application of the function support information to the corresponding function.

The present invention also provides a configuration of an electronic device that supports a pen function operation including a pen recognition panel that recognizes a touch pen according to a set mode; a control unit that collects status information of the touch pen including at least one of information on an arrangement state between the pen recognition panel and the touch pen and status information regarding whether a button of the touch pen is pushed, as well as controlling type information on a currently activated application program, and a gesture recognition information according to a gesture input operation of the touch pen, or collects the status information of the touch pen and/or the gesture recognition information; a storage unit that stores pen functions, for example, in a pen function table providing a pen function command corresponding to the collected information according to the set mode; and a display panel that displays information according to performing of a function corresponding to the pen function command.

The present invention also provides a configuration of a method for operation of a pen function including collecting a key command input by gesture input operation of a touch pen and is used for activating a specific function, and a function support information input along with the gesture input operation of the touch pen and applied to the function activated by the key command; and activating the function corresponding to the key command, and applying the function support information to the corresponding function.

The present invention also provides for configuration of a method for operation of a pen function including collecting status information of a touch pen that includes at least one of information regarding an arrangement status between a pen recognition panel of a terminal that recognizes the touch pen according to a set mode and the touch pen and status information regarding whether a button of the touch pen is detected as being actuated, type information regarding a currently activated application program, and a gesture recognition information according to a gesture input operation of the touch pen, or collecting the pen status information and the gesture recognition information; identifying a pen function command corresponding to the collected information referring to storage including but not limited to a pen function table predefined according to the set mode; and performing a function corresponding to the pen function command.

In addition, the arrangement state of the collected pen status information comprises at least one of a contact state information indicating that the touch pen is located within a first distance from the pen recognition panel, a hovering state information indicating that the touch pen is separated between the first distance and a second distance from the pen recognition panel, that is further away from the pen recognition panel than the first distance, and an air state information indicating that the touch pen is located outside of the second distance from the pen recognition panel actuator active state information indicating that an actuator has been activated; and an actuator inactive state information indicating that the actuator is not active.

A pen function method includes: collecting information by a control unit comprising: pen status information including at least one of: information regarding an arrangement state between a pen recognition panel of a terminal that recognizes proximity of a touch pen according to a particular set mode of one or more of set modes, and recognizes the touch pen and a state information on whether a actuator of the touch pen activated, type information on a currently activated application program, and a gesture recognition information according to a gesture input operation of the touch pen, or collecting the pen status information and the gesture recognition information; identifying a pen function command corresponding to the collected information by accessing associated information in storage according to the particular set mode; and performing a function corresponding to the identified pen function command.

The pen function operation method and electronic device supporting the same according to the present invention supports performance of various functions of a mobile terminal using a touch pen input adaptively, easily and more conveniently than known heretofore.

BRIEF DESCRIPTION OF THE DRAWINGS

FIG. 3 is a diagram illustrating a change in an electromagnetic induction value according to a location in which a pen of the one function system is placed;

FIG. 9, FIG. 10 and FIG. 11 are diagrams illustrating operation of a pen function according to another embodiment of the present invention;

DETAILED DESCRIPTION

Figure 1:
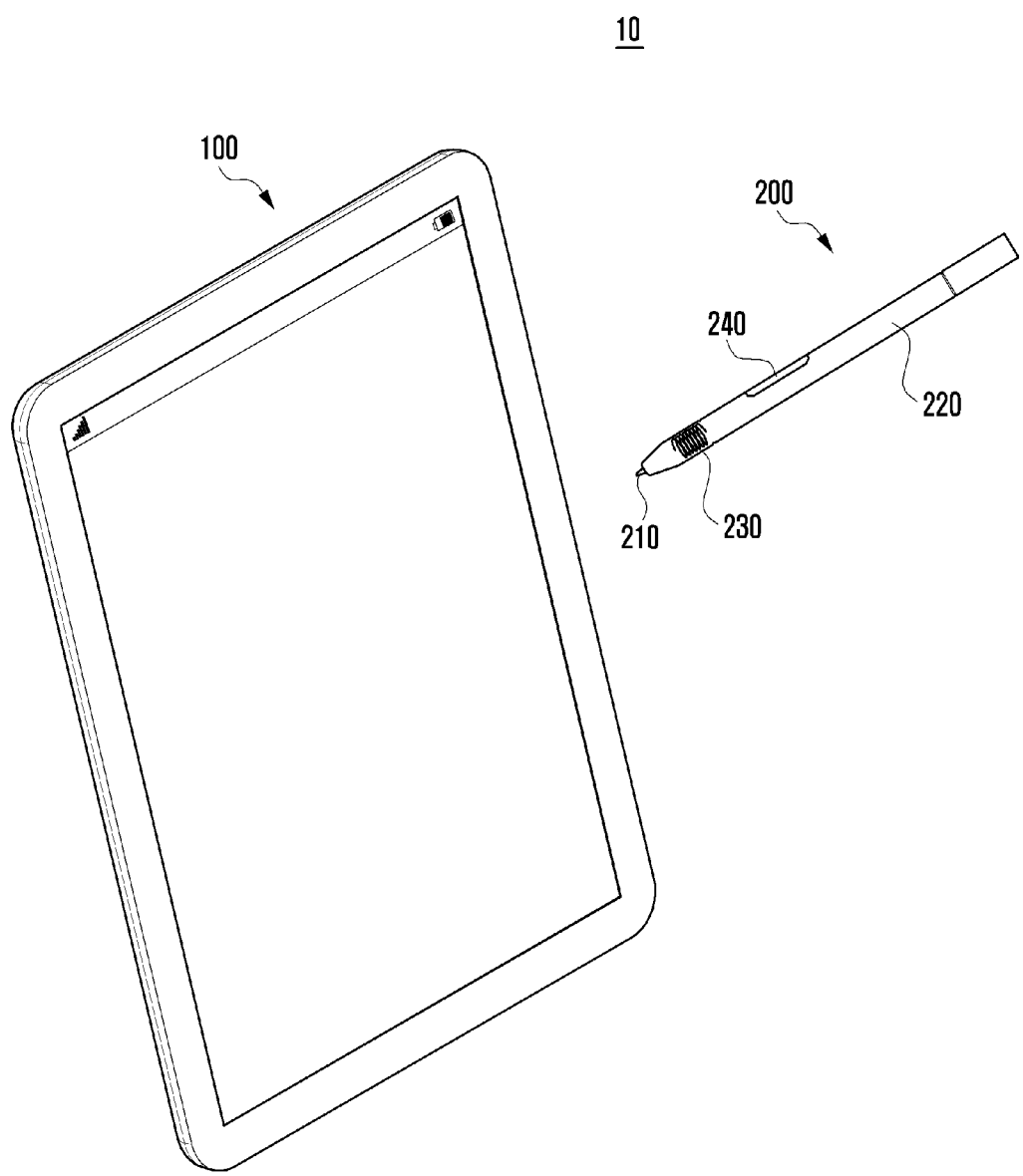
FIG. 1 is an illustration of a pen function system according to an embodiment of the present invention.

Exemplary embodiments of the present invention are described with reference to the accompanying drawings in detail. Detailed description of well-known functions and structures incorporated herein may be omitted to avoid obscuring appreciation of the subject matter of the present invention by a person of ordinary skill in the art.

For the same reason, some of elements may be depicted as exaggerated, omitted or simplified in the drawings and the elements may have sizes and/or shapes different from those shown in drawings in practice. The same reference numbers are used throughout the drawings to refer to the same or like parts.

Figure 2:
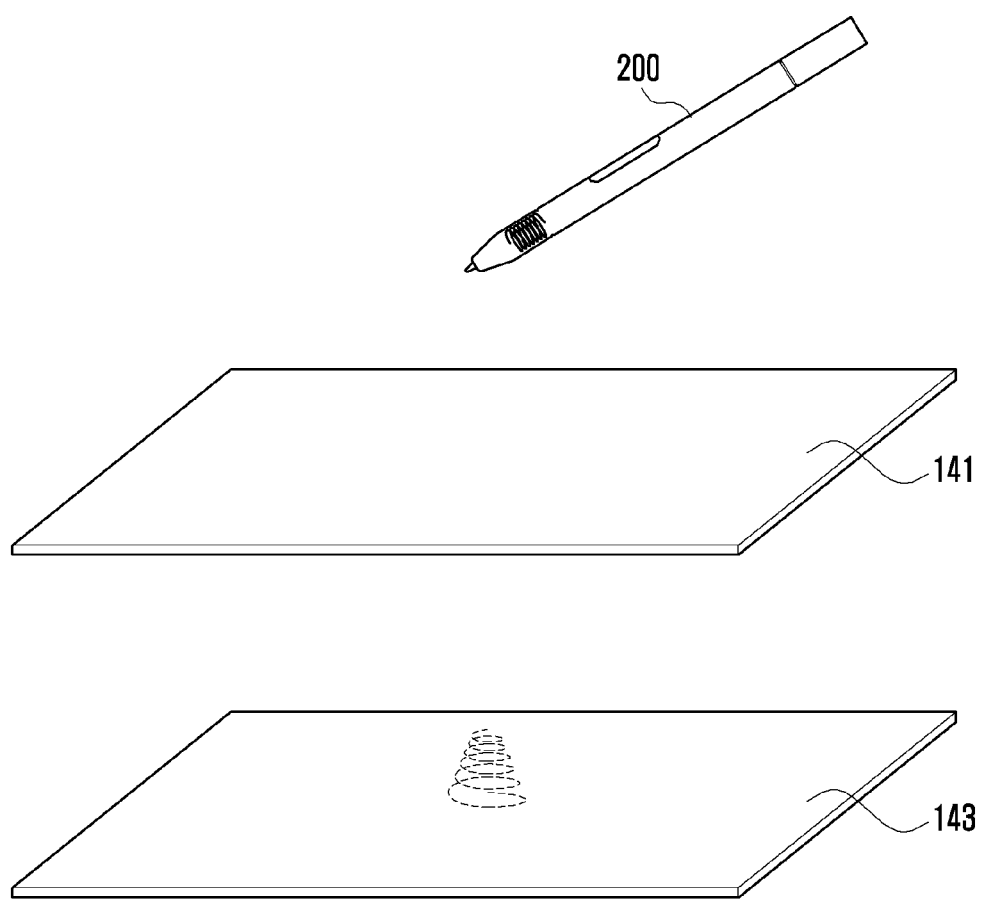
FIG. 2 is a diagram illustrating a configuration of the pen function system in detail.

FIG. 1 is a schematic diagram illustrating a configuration of a pen function system 10 according to an embodiment of the present invention, and FIG. 2 is a detailed diagram illustrating a configuration of the display unit of the terminal 100 of the system. FIG. 3 is a diagram illustrating operation of a pen recognition panel according to a location of a touch pen of the pen function system of the present invention.

Referring now to FIGS. 1 to 3, a pen function system 10 of the present invention includes a terminal 100 and a touch pen 200.

The above-structured pen function system 10 of the present invention is capable in operation of supporting execution of a user function corresponding to a specific pen function command based on a pen status of the touch pen 200 and gesture recognition of the touch pen 200 when performing a specific input operation on a display unit 140 of the terminal 100. Typically, the specific input operation is performed on a display unit off terminal 100 while holding the touch pen 200. Additionally, the pen function operation system 10 of the present invention can support the execution of a user function corresponding to a specific pen function command based on information of the currently activated application, as well as the pen state and gesture recognition values of the touch pen 200. In this way, the pen function operation system 10 of the present invention can support the user to perform various input operations faster and more conveniently by using the touch pen 200.

With reference to FIG. 2, terminal 100 includes a display panel 141 for displaying a function execution screen and a pen recognition panel 143 for operation of the touch pen 200. The terminal 100 may further include, for example a touch panel for supporting a contact touch event, and further includes a driving module and power supply for driving the touch panel, display panel 141, and pen recognition panel 143, and a container for mounting various components of the terminal 100. The terminal 100 may collect gesture information by recognizing the gesture corresponding to a pen touch event collected from the pen recognition panel 143 and may collect the pen status information provided by the touch pen 200. The terminal 100 supports operation of a user function corresponding to the specific pen function command predefined based on collected information on the pen state and gesture. At this time, the terminal 100 may support operation of user functions corresponding to other command(s) predefined according to at least one currently activated application. A description is made herein below of the detailed configuration and operations of the terminal 100 in detail with reference to accompanying drawings.

With reference to FIG. 1, the touch pen 200 includes a stem 220, a tip 210 formed at an end of the stem 220, a coil 230 arranged inside the stem 220 adjacent (for example, as shown) to the tip 210, and an actuator such as a button 240 for changing the value of electromagnetic induction generated by the coil 230. The touch pen 200 structured as above according to an embodiment of the present invention is constructed to support a capacitive-inductive method in which a magnetic field is generated at a certain position on the pen recognition panel 143 such that the terminal 100 detects the magnetic field occurrence position to recognize the touch position.

The tip 210 of touch pen 200 may contact the surface of the display panel 141 (at least a portion of the tip) or a touch panel covering the display panel 141 to make contact (or near-contact) at a certain position on the screen of the display unit 140. The term "contact" as used hear in includes near-contact, meaning that the tip does not necessarily have to physically touch the display panel 143, but rather only has to come within a predetermined distance (typically 1 or more mm) such that the display panel can detect the change in capacitance at a position of the touch pen tip 200. The tip 210 is typically formed at one end of the stem 220 with the coil 230 spaced at a certain distance from the tip 210 such that when the user holds the touch pen 200 and makes a writing input with the pen that the terminal 100 can compensate for the distance between the contact point of the tip 210 and the magnetic field occurrence position by the coil 230, particularly since, for example a left-handed versus right-handed user will tend to grip the pen different and an angle by which the pen is orientation to the display panel is different, and even people with a similar preference (right-handed, for example) will place the pen at different angles when performing gestures. According to the distance compensation, it is possible to perform input operation such as write text, draw a line, and drag and drop an item on the screen while indicating a specific position of the display panel 141. Particularly, the user may perform a specific gesture input while maintain the contact of the tip 210 on the surface of the display panel 141.

If the touch pen 200 approaches within a predetermined distance from the pen recognition panel 143 of the terminal 100 (without necessarily making physical contact with the pen recognition panel 143), the coil 230 generates a magnetic field at a certain position of the pen recognition panel 143. In order to accomplish this generation of a magnetic field, the terminal 100 may perform scanning on the magnetic field generated on the pen recognition panel 143 in real time or periodically. The pen recognition panel 143 of the terminal 100 may be activated at the time when the touch pen 200 enters an operation mode.

More particularly, the pen recognition panel 143 may recognize the status of the touch pen 200 according to the approaching distance of the touch pen 200 to the pen recognition panel 143. In other words, as shown in FIG. 3, when the pen recognition panel 143 is located at a first distance ("D1") from the display panel 141 or the pen recognition panel 143 in reference 301, the control unit of the pen recognition panel 143 may determine that the touch pen 200 is in contact state. If the touch pen 200 is located at a distance between the first distance and a second distance ("D2") as denoted by reference number 303 of FIG. 3, the control unit of the pen recognition panel 143 may determine that the touch pen 200 is in a "hovering" state. Additionally, if the touch pen 200 is located at a distance further away from the second distance D2 and still within a detectable distance range, the control unit of the pen recognition panel 143 may determine that the touch pen is in an air state. In this way, the pen recognition panel 143 of the terminal 100 is capable of providing various types of pen status information depending on the distance of the touch pen 200 from the pen recognition panel 143.

Meanwhile, the button 240 of the touch pen 200 can be actuated by applying pressure, contact, etc., and, if the button 240 is actuated, a certain signal value is generated to be output to the pen recognition panel 143. In order to achieve this output signal value, a capacitor, an auxiliary coil, or a certain device capable of changing capacitive induction may be provided in the touch pen 200 in an area adjacent to the button 240 such that the above device is connected to the coil 230 by touch or push of the button 240 to change induced electromagnetic induction value at the pen recognition panel 143, causing the control unit of the pen recognition panel 143 to determine a change in the electromagnetic value is attributed to actuation of the button 240 of the touch pen 200. The touch pen 200 may be configured to generate a radio signal in response to the push on the button 240 such that the terminal 100 receives a radio signal by a dedicated receiver and the terminal recognizes the push of the button 240 of the touch pen 200 based on the received radio signal.

As described above, the terminal 100 can collect various types of pen status information according to a placement of the touch pen 200 relative to the terminal 100. In other words, the terminal 100 is capable of receiving information used to determine whether the touch pen 200 is in a contact state, or hovering state, and whether the button 240 of the touch pen 200 is in a pushed (actuated) state or in an unpushed/unactuated or initial state. The terminal 100 can generate a specific pen function command based on the pen status information provided by the touch pen 200 and the gesture recognition information corresponding to a gesture input operation input by the coil 230 of the touch pen 200, and can support a function execution corresponding to the command.

As described above, the pen function operation system 10 of the present invention can generate and execute commands faster and more easily for controlling various functions provided by the terminal 100 based on the pen status information including the arrangement state between the terminal 100 and the touch pen 200 and the specific input state of the touch pen 200 and the various gesture recognition information according to the gesture input operation. The pen function operation system 10 of the present invention can facilitate the execution of specific functions of the terminal 100 in a particular pen status based on combined gesture recognition information. Alternatively, the pen function operation system 10 of the present invention can also perform the combined gesture recognition independently of a certain pen status and execute the function according to the recognition.

Figure 4:
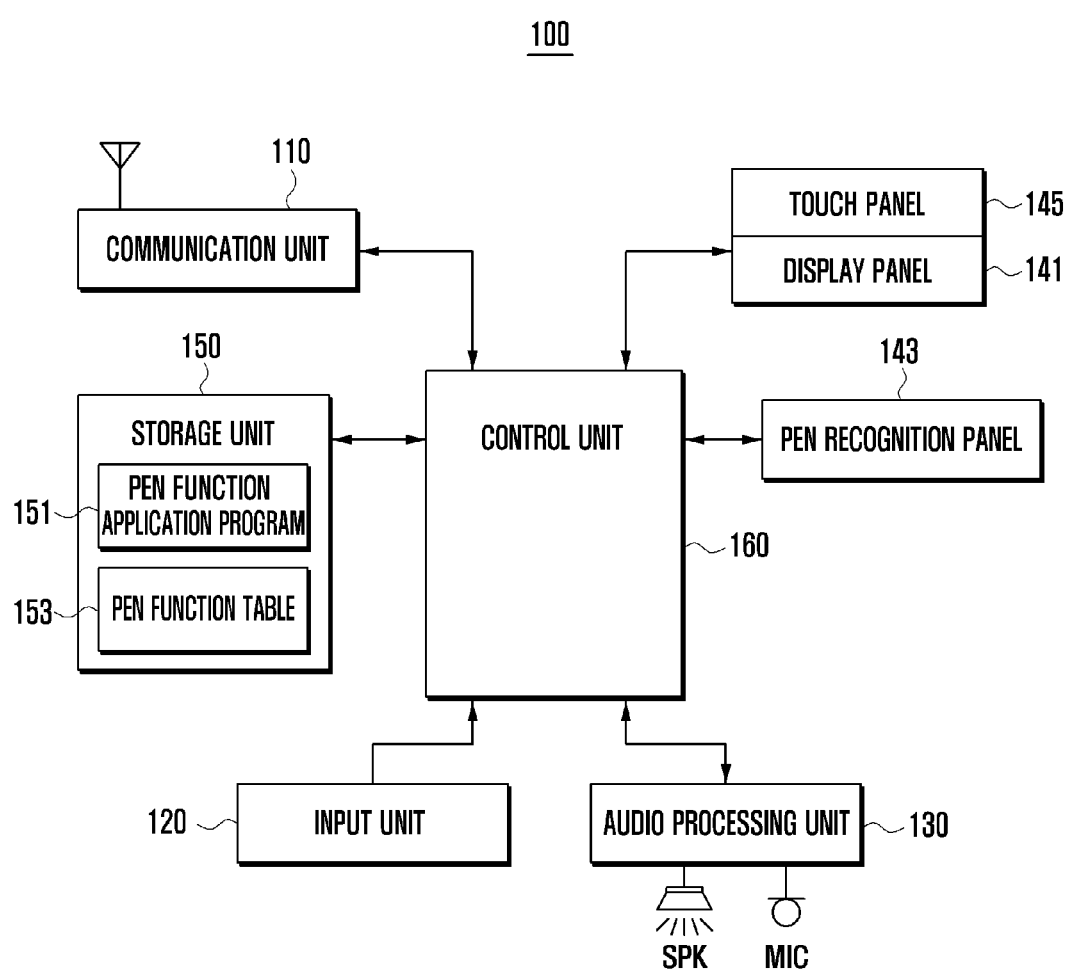
FIG. 4 is a block diagram illustrating a configuration of a terminal in a pen function system of the present invention.

FIG. 4 is a detailed diagram illustrating a configuration of the terminal 100 for supporting the pen function operation according to an embodiment of the present invention.

Referring now to FIG. 4, the terminal 100 according to an embodiment of the present invention includes a communication unit 110, an input unit 120, an audio processing unit 130, a display panel 141, a pen recognition panel 143, a touch panel 145, a storage unit 150, and a control unit 160. Although the drawing is directed to the case where the terminal 100 includes the touch panel 145, the present invention is not limited thereto. For example, the terminal 100 can be provided without the touch panel 145 as described with reference to FIGS. 1 to 3. In such a case, the terminal 100 is capable of generating an input signal for the operation of the terminal 100 by the touch pen 200 and the pen recognition panel 143 or by receiving an input signal through the input unit 120 or communication unit 110, or by voice communication via audio processing unit 130.

The above structured terminal 100 collects the pen status information of the touch pen 200 and the gesture recognition information corresponding to the gesture input operation based on the pen recognition panel 143. The terminal 100 identifies a predefined specific pen function command matching the collected pen status information and gesture recognition information, and performs a function support of the terminal according to the pen function command. The terminal 100 may collect the function type information on the currently activated application as well as the pen status information and the gesture recognition information and generating the predefined pen function command mapped to the pen state information, gesture recognition information, and function type information. Alternatively, if the gesture recognition information is the combined gesture recognition information, the terminal 100 may execute a specific terminal function according to the combined gesture recognition information.

In order to accomplish a specific terminal function, the pen recognition panel 143 is arranged at a specific position on the terminal 100 to be activated according to a predetermined event or stay in the active state as default. The pen recognition panel 143 may be formed to cover a predetermined area at a low part, e.g. display area, of the display panel 141. The pen recognition panel 143 may receive the pen status information according to the approach of the touch pen 200 and/or user manipulation on the touch pen 200 and may transfer the pen state information to the control unit 160. The pen recognition panel 143 is also status of receiving the gesture recognition information corresponding to the gesture operation of the touch pen 200 and transfers the gesture recognition information to the control unit 160.

As previously disclosed, the pen recognition panel 143 is configured to receive the position value of the touch pen 200 according to the electromagnetic induction mechanism with the touch pen 200 having the coil 230. The pen recognition panel 143 collects the electromagnetic induction value from the touch pen 200, and these values will vary in accordance with particular distance the touch pen 200 is from the pen recognition panel 143, and thus there is a correspondence between the electromagnetic induction value and the respective distance the touch pen 200 is from the pen recognition panel 143. The pen recognition panel 143 transfers the electromagnetic induction value to the control unit 160 which can determine a distance of the touch pen 200 from the pen recognition panel 143 as discussed above. At this time, the transferred electromagnetic induction value is used to determine the pen status information, that is, the information corresponding to a hovering state which is a state where the touch pen 200 is separated at a given distance from the pen recognition panel 143 or the display panel 141 or the touch panel 145, or a contact state in which it is adjacent to the display panel 141 or touch panel 145 by a given distance. The particular given distance is determined based on the particular electromagnetic induction value.

Meanwhile, the pen status information collected by the terminal 100 may be generated differently depending on the structure of the button 240 of the touch pen 200. In the case that the button 240 changes the electromagnetic induction generated by the coil 230 as described above, the pen status information for input of the button 240 is received by the pen recognition panel 143 and then transferred to the control unit 160. For example, a capacitor selectively connected to the button 240, and a separate coil may be used for changing electromagnetic induction value, and a specific device capable of changing the electromagnetic induction on the pen recognition panel 143 may be applied. In the case that the button 240 provide in a separate configuration for transmitting a radio signal, the terminal 100 may further include a reception device for receiving the radio signal according to input of the button 240, and the control unit 160 determines whether the button is input based on the radio signal received by the reception device.

With continued reference to FIG. 4, the touch panel 145 may be arranged on one of the top and bottom surfaces of the display panel 141 and transmit to the control unit 160 the information on the touch position and touch state according to the change in capacitance or resistance or voltage which is caused by a touch of an object. The touch panel 145 may be prepared on at least a part of the display panel 141, and may be deactivated at the time when the pen recognition panel 143 is activated according to a design method. In other words, the touch panel 145 of the present invention may stay in the deactivated state while supporting a command creation function based on the pen status information and gesture recognition information, or pen status information and gesture recognition information plus function type information, or combined gesture recognition information provided by the pen recognition panel 143.

The display panel 141 displays various screens associated with the operation of the terminal 100. For example, the display panel 141 may display various screens such as an initial standby screen for supporting operation of a function of the terminal 100, menu screen, file search screen according to a function selection, file playback screen, broadcast playback screen, file edit screen, web page access screen, memo screen, ebook screen, chat screen, email or message composition and reception screen, etc. according to a corresponding function activation, just to name a few non-limiting screens. The screens provided by the display panel 141 may provide information on the types of functions, and the function type information may be transferred to the control unit 160. In the case that a function of the display panel 141 is activated, the pen recognition panel 143 may be activated according to a pre-configured setting. The gesture recognition information input by the pen recognition panel 143 may be displayed on the display panel 141 in a predetermined format. For example, in the case that the gesture recognition information is of a gesture corresponding to a specific figure, the display panel 141 displays an image corresponding to the figure. The user can identify which gesture is input by him while checking the figure.

In an embodiment of the present invention, the start and end times of the gesture input can be identified based on the change in the pen status information of the touch pen 200. In other words, the gesture input may start in one of the contact or hovering states of the touch pen 200 and ends in one of the contact or hovering states. The user may perform a gesture input operation with the touch pen 200 which is performed in the state of contacting on the display panel 141 or hovering at a distance from the display screen 141. For example, if the touch pen 200 moves within a range of the contact state, the terminal 100 recognizes as the gesture input and performs gesture recognition according to the movement.

If the touch pen 200 is within a range of the hovering state, the terminal 100 continues to recognize as an effective operation for gesture input although not recognizing the gesture input according to the movement. Accordingly, the user may perform movement by contacting the display panel 141 with the touch pen 200 to perform operation for real gesture input, separate the touch pen 200 from the display panel 141, contact them again and then perform a combined gesture input.

The storage unit 150 stores various programs and data necessary for the operation of the terminal 100 of the present invention. For example, the storage unit 150 stores Operating System (OS) necessary for operation of the terminal 100 and programs associated with the functions for displaying screens on the display panel 141 that are loaded into hardware such as the control unit for execution. More particularly, the storage unit 150 stores the pen function operation program 151 for supporting the pen function operation of the present invention and may include storage of a pen function table 153 for supporting the pen function operation program 151.

The pen function operation program 151 may include various routines for supporting the pen function operation that are executed by hardware such as the control unit. For example, the pen function operation program 151 comprises machine executable code and may include routines for identifying an activation condition of the pen recognition panel 143, routines for collecting the pen status information of the touch pen 200 in activation of the pen recognition panel 143 and routines for collecting the gesture recognition information through the recognition of the gesture according to the movement of the touch pen 200. The pen function operation program 151 may include routines of creating a specific pen function command based on the collected pen status information and the gesture recognition information and routines for executing the function according to the pen function command. The pen function operation program 151 may further include the routines for collecting type information of the function which is in an activation state, routines for creating a pen function command mapped to the type information of the collected function, pen status information, and gesture recognition information, and routines for performing the function according to the pen function command. Also, the pen function operation program 151 may include the routines for discriminating and identifying the input operation as the sub-gesture recognition information when a gesture input operation to be input is input operation for a combined gesture recognition information, routines for creating a specific pen function command based on the discriminated sub-gesture recognition information, and routines for performing the function according to the created pen function command. In all cases, hardware such as the control unit executes the machine executable code to configure the control unit for operation.

Moreover, the pen function command creating routine creates a command referring to the pen function table 153 stored in the storage unit 150. The pen function table 153 can be a table including the pen function command mapped to the specific terminal function operation corresponding to the input operation with the touch pen 200. Particularly, the pen function table 153 maps the gesture recognition information input according to the pen status information and the function type information to the pen function command such that the same gesture recognition information may be set to operate differently according to the pen status information and the function type information. The pen function table 153 may include information, in which the pen function commands corresponding to the specific terminal function operation are defined, in the pen status information and gesture recognition information. The pen function table 153 may be composed of only the pen status information and gesture recognition information and may perform a specific function operation based on only the pen status information and gesture recognition information regardless of the type of the currently activated function. The pen function table 153 may include the combined gesture recognition informations and pen function commands mapped thereto. The pen function table 153 including the combined gesture recognition informations may perform a specific terminal function support based on only the input combined gesture recognition information regardless of the pen status information or type of the currently activated function.

In addition, an artisan should understand and appreciate that the table 153 is but one way to store and map information, and the claims are not limited to the use of a table.

The pen function table 153 may also include, for example, at least one of a first pen function table including pen function commands to which the pen status information, function type information, and gesture recognition information are mapped; a second pen function table including pen function commands to which the pen status information and the gesture recognition information are mapped; and a third pen function table including pen function commands to which the combined gesture recognition information is mapped. The pen function table 153 including the pen function commands may be applied selectively or automatically according to the user setting or the type of the currently activated application program. For example, the user may set whether to use the first pen function table or the second pen function table. Thus, the terminal 100 may perform the gesture recognition corresponding to the input operation based on the specific pen function table according to the user setting.

The terminal 100 may apply a particular pen function table to a particular activated application, for example the second pen function table may be applied when a first application program is activated, the third pen function table may be applied when a second application program is activated, and the first pen function table may be applied when a third application program is activated, according to the system design, system default or user setting. According to an embodiment of the present invention, the pen function table 153 may be applied in various ways depending on the type of the activated functions. Exemplary cases of applying the pen function table 153 are described later in detail with reference to accompanying drawings.

The communication unit 110 is included in the case that the terminal 100 supports communication function. Particularly, in the case that the terminal 100 supports the wireless communication function of various protocols, and the communication unit 110 can be implemented, for example, as a radio communication module that includes hardware such as a receiver, transmitter or receiver. The communication unit 110 may perform the communication-based terminal function such as a chat service function, text messaging function, and telephony function and, if the gesture recognition information is collected from the touch pen 200 in the state that the communication unit 110 is operating, the terminal 100 executes the pen function command corresponding to the gesture recognition information under the control of the control unit 160.

The communication unit 110 may receive update information for the pen function table 153 from outside of the terminal 100 and transfer the update information to the control unit 160 as well as support normal communication function of the terminal 100. As described above, the pen function table 153 can be configured differently depending on the type of the terminal function corresponding to the currently activated application program. In the case that a new function is installed in the terminal 100, there can be new configuration settings in association with the operation of the touch pen 200. In the case that the pen function table 153 is provided for the new function or for a previously-installed function, the communication unit 110 may receive the information on the corresponding pen function table 153 as default or in response to the user request.

The input unit 120 can be composed of various keys, or side keys and a touch pad. The input unit 120 may include a button key for a turn-on/off operation and a home key for returning the screen to the basic home screen supported by the terminal 100. The input unit 120 may generate an input signal for configuring a pen function operation mode according to the user input and transfer the generated input signal to the control unit 160. In other words, the input unit 120 may generate an input signal for configuring a basic pen function operation mode for performing a function according to the pen position recognition without performing a gesture recognition function or a pen function operation mode based on any of the various pen function table 153 described above. The terminal 100, for example, via control unit 160, may call a specific pen function table 153 according to the corresponding input signal and execute a specific pen function based on the pen function table 153.

The audio processing unit 130 includes at least one of a speaker (SPK) for outputting audio signal of the terminal 100 and a microphone (MIC) for receiving audio signals. The audio processing unit 130 includes circuitry such as an audio processor and may output guidance sounds or effect sounds for guiding the pen function operation mode configuration of the present invention according to the preconfigured settings. If the pen recognition panel 143 collects the gesture recognition information according to a specific gesture operation, the audio processing unit 130 outputs guidance sound corresponding to the gesture recognition information or effect sound according to the execution of the function. The audio processing unit 130 may output sounds effects corresponding to the gesture input in real time during gesture input operation. Additionally, the audio processing unit 130 may control a vibration module, which may comprise hardware such as a piezoelectric or electrorestrictive material, to adjust the vibration intensity of the vibration module according to the gesture input operation. At this time, the audio processing unit 130 may change the vibration intensity according to the input gesture recognition operation. In other words, the audio processing unit 130 may control to have a vibration intensity corresponding to each gesture recognition information if the information associated with each respective gesture recognition information to be executed is different. The audio processing unit 130 may change the loudness or type of the effect sound depending on the type of the gesture recognition information. For example, if a gesture recognition information related to the currently activated function is collected, the audio processing unit 130 may outputs the vibration or sound effect having a predetermined intensity and, if a gesture recognition information for calling another function is collected, outputs the vibration or effect sound having a relatively high intensity.

The control unit 160 includes various circuitry components for supporting the pen function operation according to an embodiment of the present invention and can be configured to control signal and data processing for the pen function operation with these components. In order to accomplish these operations, the control unit 160 includes underlying hardware that constitute the various components as depicted in FIG. 5, and the circuitry can include integrated circuits of a processor or microprocessor.

Figure 5:
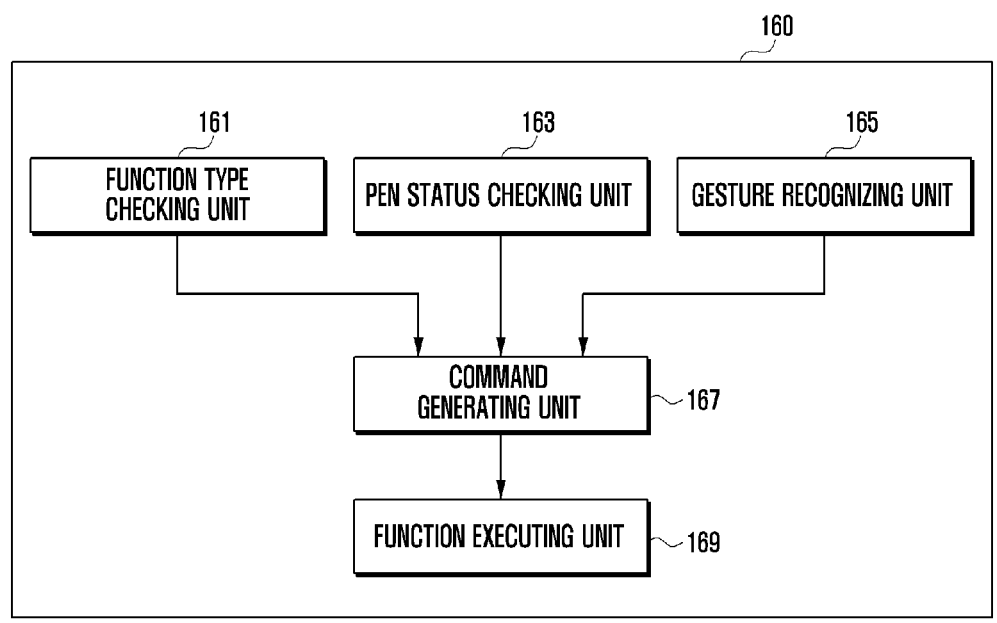
FIG. 5 is a block diagram providing detail of a configuration of a control unit of the terminal of FIG. 4.

FIG. 5 is a diagram illustrating a configuration of the control unit 160 of the present invention.

Referring now to FIG. 5, the control unit 160 includes a function type checking unit 161, a pen status checking unit 163, a gesture recognizing unit 165, a command generating unit 167, and a function executing unit 169.

The function type checking unit 161 checks the type of the currently activated user function of the terminal 100. More particularly, the function type checking unit 161 collects the information on the type of the function related to the screen displayed on the display panel 141. In the case that the terminal 100 supports a multitasking function, multiple functions may be activated according to activation of the multiple application programs. In this case, the function type checking unit 161 collects only the type information of the function associated with the current display screen on the display panel 141 and sends it to the command generating unit 167. In this procedure, the function type checking unit 161 may collect the type information of the function related to the screen output in the uppermost layer in the case that multiple screens are displayed on the display panel 141.

The pen status checking unit 163 collects information corresponding to the position of the touch pen 200 and whether the button 240 of the pen is pushed. As described above, the pen status checking unit 163 scans the pen recognition panel 143 to detect change in the electromagnetic induction to determine whether the touch pen 200 is in the hovering state or contact state and whether the button is in the pushed state or not and collects the corresponding pen status information. The collected pen status information may be provided to the command generating unit 167.

The gesture recognizing unit 165 recognizes the gesture according to movement of the touch pen 200. The gesture recognizing unit 165 recognizes the gesture according to movement of the touch pen 200 regardless of whether the touch pen 200 is in the hovering state or the contact state and sends the gesture recognition information to the command generating unit 167. The gesture recognition information provided by the gesture recognizing unit 165 may include the single gesture recognition information recognized as one object or a combined gesture recognition information recognized as plural objects. The gesture recognition informations can be discriminated according to the definition on the gesture input operation process. All of the various units shown in FIG. 5 comprise hardware, and there can be one or more integrated circuits that perform the respective operations, which have been illustrated as separate units. However, these units may be combined in whole or part in terms of structure.

For example, in this example the input operation corresponding to movement occurs continuously in the contact state, or the hovering state may generate the signal recognition information. The input operation in this example corresponds to movement occurring while the contact state and/or the hovering state are being changed (the movement occurs while the state is being changed), and the gesture recognizing unit 165 may generate the combined gesture recognition information. Alternatively, if movement occurs while the hovering state is being changed to the air state, the gesture recognizing unit 165 may recognize as a combined gesture recognition information. Or, the gesture recognizing unit 165 may determine that multiple gestures have occurred based on boundary where the touch pen 200 moves out of a recognizable range from the pen recognition panel 143, as operation for the combined gesture recognition. In the case of gesture recognition based on the boundary where the touch pen 200 moves out of a predetermined range from the pen recognition panel 143, the gesture recognizing unit 165 outputs a button map for the gesture input such that can be utilized to determine completion of the gesture input.

With continued reference to FIG. 5, the command generating unit 167 generates a pen function command using at least one of the function type information provided by the function type checking unit 161 according to a configuration mode, the pen status information provided by the pen status checking unit 163, and the gesture recognition information provided by the gesture recognizing unit 165. In this procedure, the command generating unit 167 may access the pen function table 153 (FIG. 4) in order to define various pen function commands. More particularly, the command generating unit 167 may refer to the first pen function table corresponding to the function type information, pen status information, and gesture recognition information as described above; the second pen function table based on the pen status information and the gesture recognition information; or the third pen function table based on the gesture recognition information. The pen function command generated by the command generating unit 167 is transferred to the function executing unit 169.

The function executing unit 169 controls the function operation corresponding to the pen function command generated and sent by the command generating unit 167. The function executing unit 169 may execute a specific function related to a currently activated function, call a new function, or end a specific function. The function execution procedure of the function executing unit 169 is described in more detail hereinafter with reference to accompanying drawings.

Figure 6:
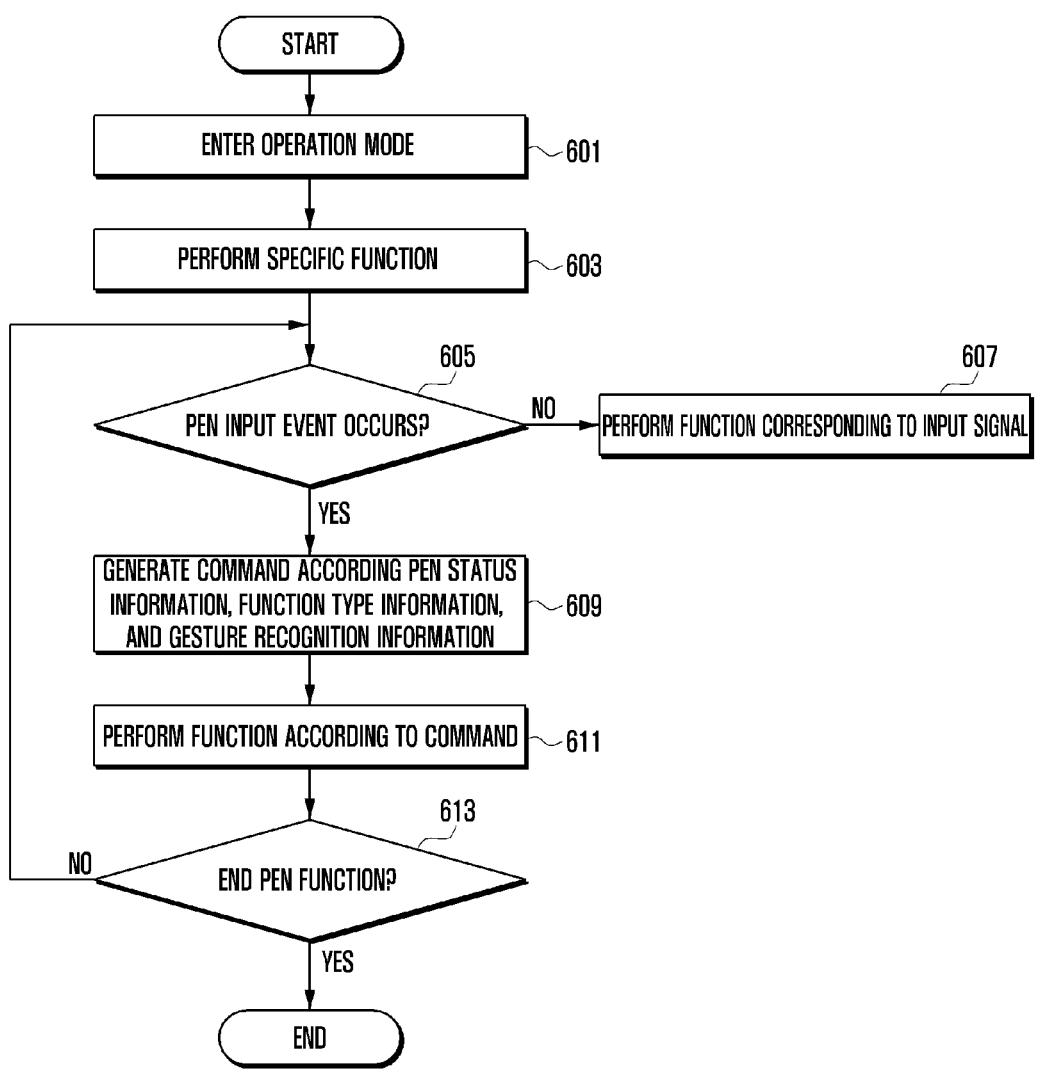
FIG. 6 is a flowchart illustrating a non-limiting exemplary operation of the pen function method of the present invention.

FIG. 6 is a flowchart illustrating operation of a pen function method according to an embodiment of the present invention.

In the pen function method according to an embodiment of FIG. 6, at (601) the terminal 100 enters an operation mode.

At (603), the control unit 160 performs a specific function according to predetermined schedule information or according to signal input from the input unit 120 or the touch panel 145 having an input function. For example, the control unit 160 may control the display panel 141 to display a standby mode screen or menu screen. The control unit 160 may control playback of specific music files and webpage display in the state that the terminal is connected to a website.

If a specific input signal is generated, then at (605) the control unit 160 determines whether the input signal is for a pen input event. For example, the control unit 160 determines whether a request for the pen function operation is generated. The request for the pen function operation is generated when the input signal for calling a function operated based on the pen function is generated or when a mode configuration input signal for the pen function operation is generated.

If at (605) the control unit determines the specific input signal is not a pen input event then at (607) the control unit 160 performs a specific function according to the input signal. For example, the control unit 160 may change a file during playback of the file, stop playback of a file or adjust volume of the audio signal according to the input signal.

When the input signal corresponding to the pen input event occurs at (605), then at (609) the control unit 160 collects at least one of the pen status information, function type information, and gesture recognition information and creates a pen function command according to the collected information.

At (611), the control unit 160 performs a function according to the generated command from (609). Examples of execution of the pen function command are described hereinafter in more detail with reference to accompanying drawings.

At (613), the control unit 160 determines whether an input signal for ending a pen function operation is generated. If the input signal for ending the pen function operation is not generated, the procedure the control unit re-performs the task at (605) to determine when a pen input event occurs.

As described above, the pen function operation method according to an embodiment of the present invention may facilitate the control of the terminal's operation based on at least one of the pen status information, function type information, and gesture recognition information.

Figure 7:
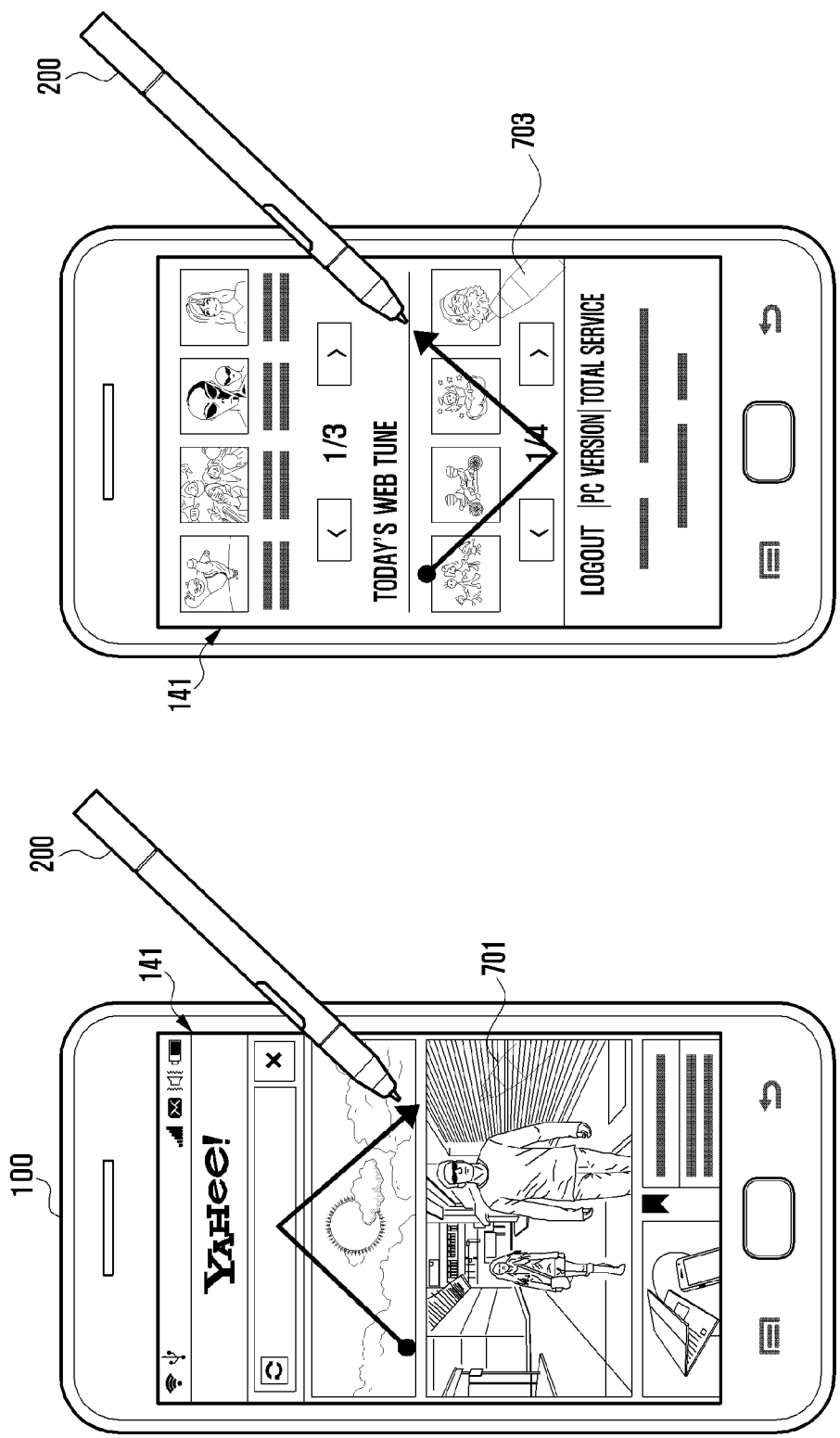
FIG. 7 and FIG. 8 are exemplary diagrams of a display screen of an electronic device illustrating operation of a pen function according to an embodiment of the present invention.
Figure 8:
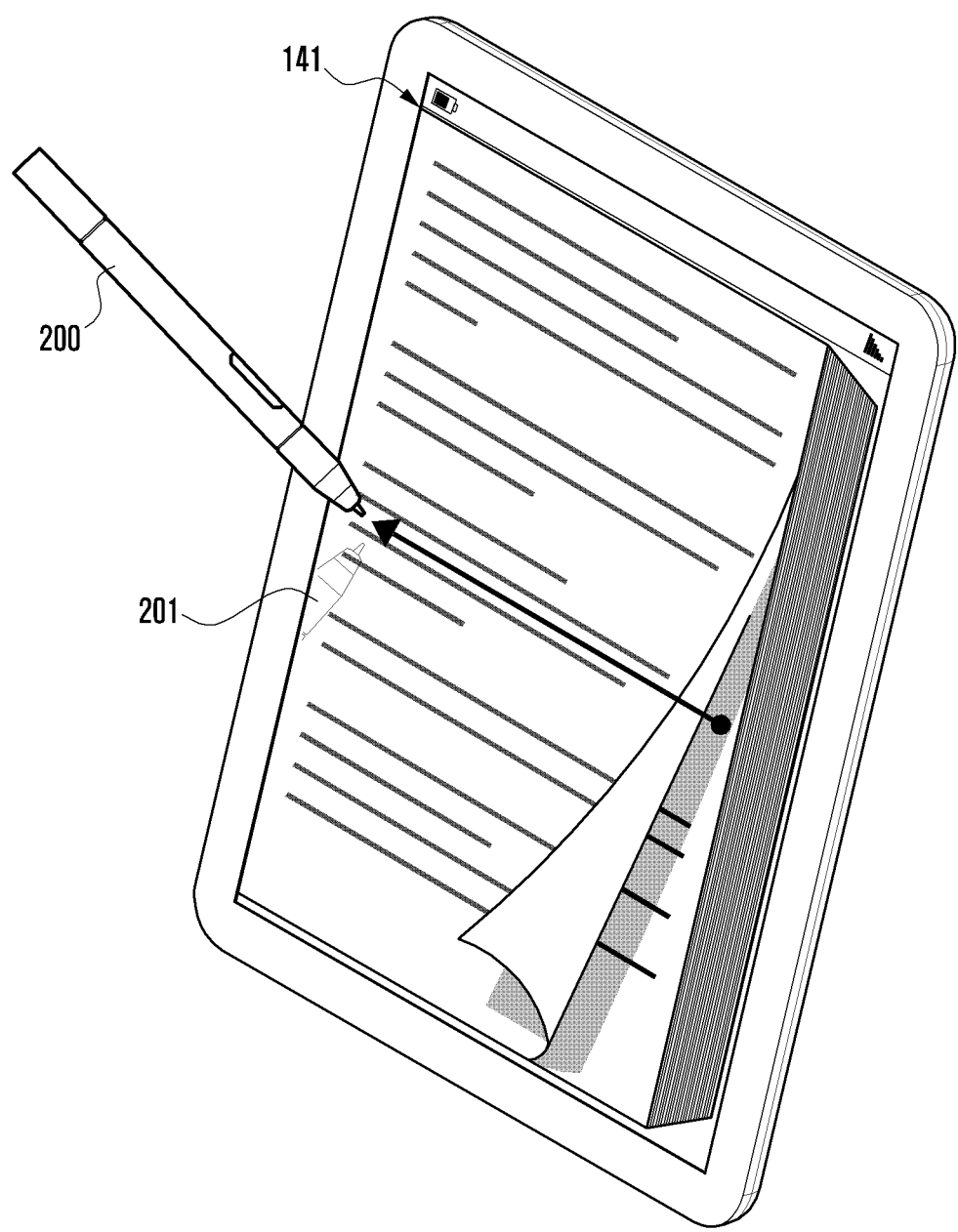

FIGS. 7 and 8 are diagrams illustrating a pen function operation in a hovering pen status according to an embodiment of the present invention.

Referring now to FIG. 7, the terminal 100 activates a specific user function in response to the user request or selection. For example, the terminal 100 may access a webpage according to the user manipulation and display the webpage screen on the display panel 141 as denoted by reference number 701. For this purpose, the control unit 100 activates the communication unit 110 and accesses the webpage based on the address of the webpage and receives the information of the webpage screen from a server providing the webpage.

In the case where the webpage access function is configured to be controlled by operation of the pen function, and the input signal for operation of the pen function is generated, the terminal 100 controls the display panel 141 to display the corresponding webpage and activates the pen recognition panel 143. In the procedure, the terminal 100 via control unit 160 controls activation of the touch panel 145 too depending on the terminal configuration. If the pen recognition panel 143 is activated for operation of the pen function, the pen recognition panel 143 is powered and scans to determine whether an input operation of the touch pen 200 according to the electromagnetic induction is generated.

In this particular device status of the terminal 100, the device can detect a specific gesture, e.g. drawing an inverted "V" shape, with the touch pen 200 in the hovering range of a predetermined distance from the display panel 141 of the terminal 100. If the input gesture of an inverted "V" shape is detected in the hovering range, the pen recognition panel 143 performs gesture recognition corresponding to the input gesture to collect the gesture recognition information. In addition, the terminal 100 may collect the pen status information indicating that the touch pen 200 is in the hovering range of the pen recognition panel 143.

If the gesture recognition information is collected in the hovering state while the webpage screen is being displayed on the display panel 141 as denoted by reference number 701, the terminal 100 identifies a pen function command for the corresponding state by referring to associated information in storage, for example, via the pen function table 153. The terminal 100 executes the pen function command defined in the pen function table 153 to perform a specific function, e.g. scrolls the webpage up to the top of the screen to display the scrolled webpage on the display panel 141.

If the gesture recognition information of drawing a "V" shape with the touch pen 200 is collected in the hovering state while the web page screen is displayed on the display panel 141 as denoted by reference number 703, the terminal 100 refers to associated information in storage, for example, via the pen function table 153, in order to identify the corresponding pen function command. As shown in the drawing, the terminal 100 scrolls the webpage down to the bottom of the screen to display the scrolled webpage on the display panel 141.

Referring now to FIG. 8, the terminal 100 in this non-limiting illustration displays an ebook content screen on the display panel 141 in an ebook reading mode. The terminal 100 may store the ebook content in the storage unit 150, providing the ebook reading menu, establish a connection to a specific server providing ebook content, and receive and output ebook contents provided form the server.

If the ebook reading function is configured to support operation of the pen function, or if an input signal is generated for operation of the pen function, the terminal 100 may via the control unit control activation of the pen recognition panel 143 and activate the panel 143. In response to a detected input gesture, e.g. drawing a line from right to left with the touch pen 200 in the hovering state on the touch panel 141 displaying the ebook content as shown in FIG. 8, the terminal 100 identifies the pen function command corresponding to the gesture recognition information by the touch pen 200, the ebook content playback function, and the hovering state from, for example, the pen function table 153. The terminal 100 performs the corresponding function, e.g. turning the page, according to a pen function command.

In the procedure, the terminal 100 can display the line drawing image on the display panel 141 to identify a shape the of how the gesture input operation appears. The terminal 100 can display a mirror image 201 of the touch pen 200 on the display panel 141 in order to notify the user that the touch pen is in the hovering state. The mirror 201 of the touch pen 200 can be provided in the case of FIG. 7.

If the user makes a gesture of drawing a line in the state that the touch pen 200 is in the contact state with the display panel 141, the terminal 100 may identify the pen function command corresponding to the function type information on the ebook content playback, the gesture recognition information on drawing a line, and the pen status information on the contact state to the display panel 141 from the pen function table 153. For example, the terminal 100 executes the command to display the line drawn with the input gesture made on the ebook content screen. If the touch pen 200 is in the contact state, the terminal 100 hides the mirror image to notify the user that the touch pen 200 is in the contact state with the pen recognition panel 143.

Figure 9:
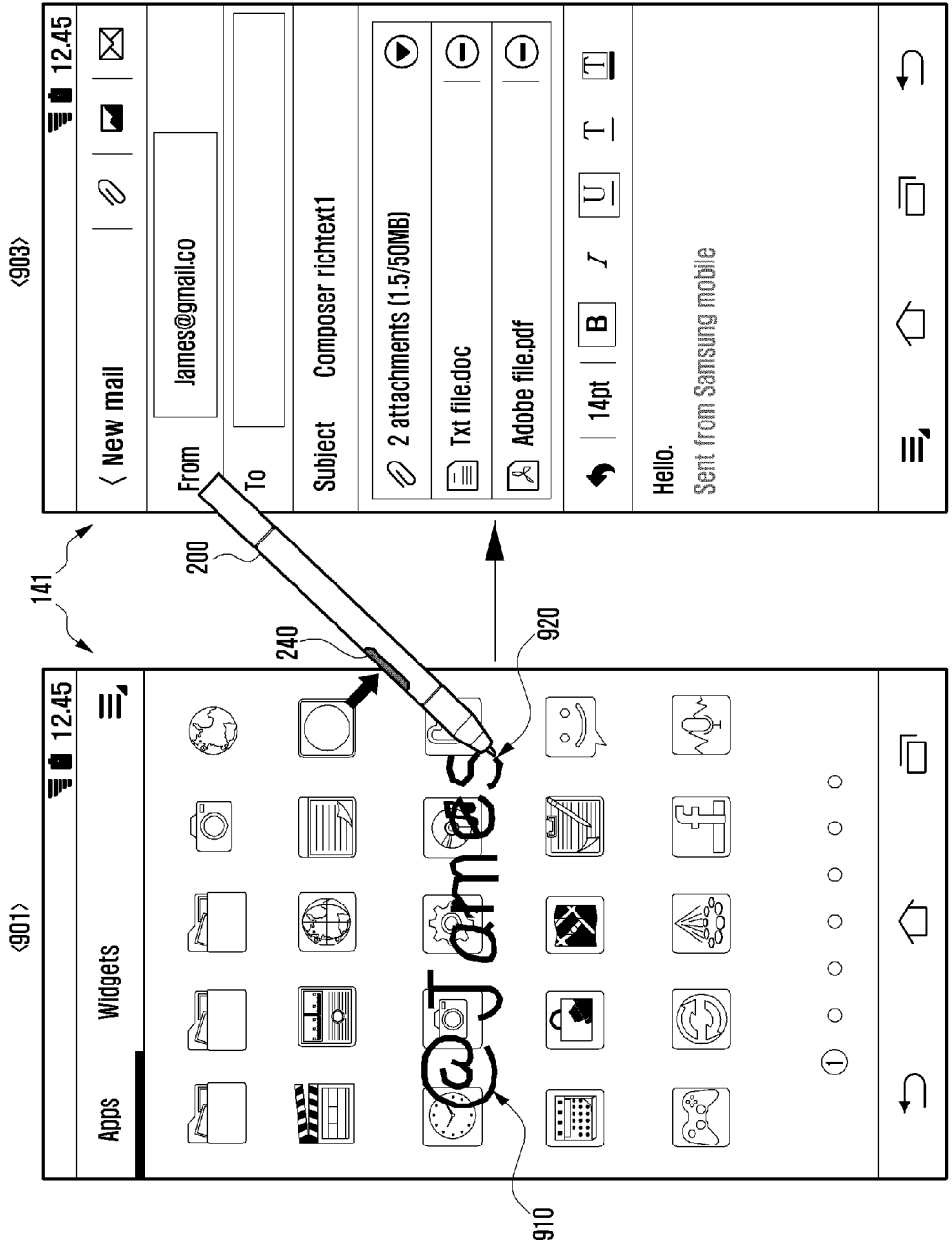
Figure 10:
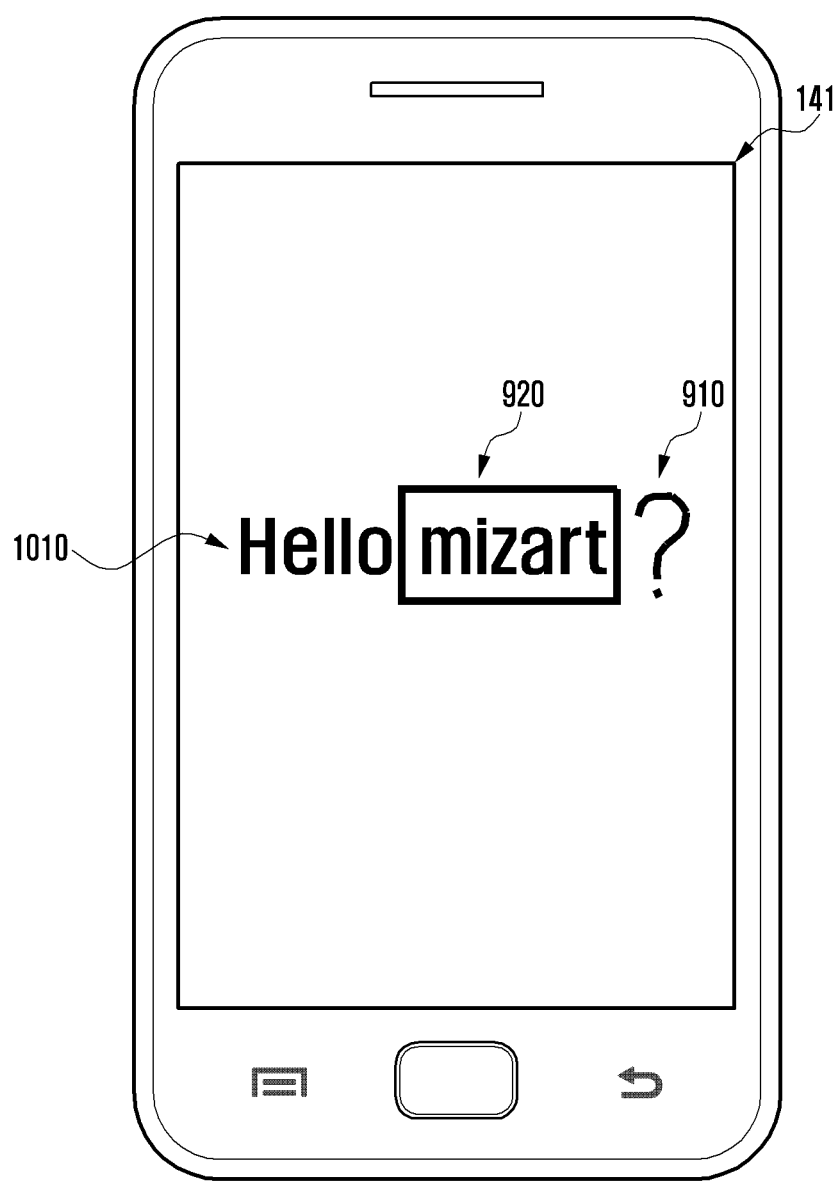

FIGS. 9 10 and 11 are diagrams illustrating exemplary situations of operation of a pen function according to another embodiment of the present invention.

Referring now to FIG. 9, the terminal 100 displays a menu screen on the display panel 141 according to a preconfigured scheduling information or user manipulation as denoted by reference number 901. If the menu screen display function is configured to support operation of the pen function or if an input signal for operation of the pen function is received, the terminal 100 activates the pen recognition panel 143. A gesture input is made on the display panel 141 displaying the menu screen using the touch pen 200. In this procedure, the specific input gesture is made with the touch pen 200 contacted on the display panel 141 in the state of or after pushing the button 240 of the touch pen 200.

Then the terminal 100 detects the input gesture and displays the information corresponding to the gesture on the display panel 141. At the same time, the terminal 100 can collect the pen status information corresponding to the state of whether the button 240 is pushed and the touch pen contacts the touch panel 141. The terminal 100 identifies the pen function command corresponding to the gesture recognition information corresponding to the recognized input gesture and the pen status information from the pen function table 153. Thereafter, the control unit 100 executes the pen function command to perform the corresponding function.

In this procedure, the gesture recognition information collected by the terminal 100 may be the combined gesture recognition information. As previously-disclosed, the combined gesture recognition information is the information distinguished and recognized as the plural objects. In other words, the writing of "@James" can be distinguished and recognized as the first object "@" 910 and the second object "James" 920. In order to achieve this, the pen function table 153 may include the information regarding the first and second objects 910 and 920, or contains a routine for the writing method distinguished as multiple plural objects. For example, the first object 910 corresponding to a specific key command may be a pen function command for calling a function, e.g. symbol or special character, and the second object 920 following the first object 910 may be function support information to be applied to the corresponding function.

In the exemplary screen 901, the first object "@" 910 can be the pen function command for calling the email function, and the second object "James" 920 can be the information on the recipient of the email or a search keyword for the recipient information. If a combined gesture recognition information including plural objects is input as shown in the exemplary screen 901, the terminal 100 searches the phonebook for the email address matching the second object "James" and fills in the recipient field the retrieved email address of email function activated according to the first object "@.

As described above, the terminal 100 can facilitate control of a specific function by executing the pen function command mapped based on the pen status information and gesture recognition information of the touch pen 200. In addition, the terminal 100 can activate a specific function based on the gesture recognition information and the pen status information input regardless of the currently activated function.

Referring now to FIG. 10, the terminal 100 according to an embodiment of the present invention can support operation of the pen function based on the combined gesture recognition information. The terminal 100 can display a text 1010 on the display unit 141 as depicted in the drawing according to the user manipulation or preconfigured scheduling information. Here, the text 1010 may be information provided based on various functions such as the information displayed on a message screen, information provided on a chatting screen, information provided on a webpage screen, information provided on a document screen, etc.

Here, it is assumed that the text information display function supports operation of the pen function. The terminal 100 may activate the pen recognition panel 143 and recognize the touch pen 200 when the touch pen 200 contacts (or nearly-contacts as discussed hereinabove) the surface of the display panel 141. If the user makes a combined gesture input as shown in the drawing, the terminal 100 collects the combined gesture recognition information composed of plural objects in the text information 1010. In other words, the terminal 100 recognizes the second object 920 indicates a part of the text information 1010 and the first object 910 represents a key command.

In order to accomplish the combined gesture recognition a of text information 1010 and the first and second objects 910, 920, the terminal 100 can via control unit 160 access associated information in storage, for example, such as the pen function table 153 storing predefined informations for recognition of the combined gesture input operation. The pen function table 153 may include a routine of generating plural objects. The control unit 160 extracts a part of the text information which is input as the second object 920 in the rectangular box and extracts the pen function command corresponding to ?" input as the first object 910 referring to the pen function table 153 and performs the search function corresponding to the pen function command based on the extracted part of the text. Although the object corresponding to "?" is recognized first and then an object for selecting at least a part of the text information 1010 is recognized, the terminal 100 can perform the same function.

As described above, the terminal 100 according to the present invention is configurable to support a specific pen function operation based on only the gesture recognition information regardless of the pen status information and the function type information.

Furthermore, the terminal 100 can be configured such that the pen status information-based application range is adjusted for operation of the pen function based on the combined gesture recognition information. For example, if the combined gesture recognition information for the search function is collected, the terminal 100 checks the pen status information and determines the search range of the corresponding search function. For example, if the combined gesture recognition information is collected in the state that the button 240 of the touch pen 200 is actuated, the terminal 100 performs the search function corresponding to the combined gesture recognition information by the web server.

If the combined gesture recognition information is collected in the state where the button 240 of the touch pen 200 is not actuated, the terminal 100 restricts the search function corresponding to the combined gesture recognition information to the information stored in the storage unit 150 of the terminal 100 or to the information related to the currently activated user functions. By adjusting the search range, the terminal 100 provides additional various information search results or provides a search result more quickly than heretofore.

Referring now to FIG. 11, the terminal 100 may support various types of gesture recognition information as shown. The gesture recognition information may include a pen function command corresponding to independent single gesture recognition information, pen function command corresponding to the combined gesture recognition information, and function support information to be applied to the functions activated by the pen function command. In more detail, if an input signal is generated for operation of a pen function, the terminal 100 executes the function for supporting operation of the pen function so as to display a virtual pen pad 147 according to the pen function on the display panel 141. The virtual pen pad 147 can be displayed on the display panel 141 transparently or semi-transparently.

The can create a specific input gesture with the touch pen 200 on the virtual pen pad 147. At this time, the input gesture made by the user may include a single gesture recognition information 1110 corresponding to the key command and a combined gesture recognition information 1120 composed of the key command and the function support information. As shown in the drawing, the key command may be the command corresponding to a special character key or key values provided in a specific keypad. For example, as shown in the drawing, the key command may include the "at mark, question mark, equal mark, sharp mark, triangle mark having two vertices on the vertical line and one vertex in the right, mail envelop mark, sandglass mark, pigtail mark, ribbon mark, text balloon mark, clip mark, and star mark.

The "at" (@) mark represents the key command for email transmission, and the question mark represents the key command for search. The equal mark represents the key command related to the mathematical calculation for providing calculation results using the numerals and computing symbols following the equal mark. Therefore, the terminal can perform simple calculations immediately without calling up a separate calculator application. The sharp mark represents the key command related to a planner function to support activation of a scheduling table and planner function such that numerals entered after the sharp mark are recognized as date information to call the planner information on the corresponding date or display a screen for entering the planner information of the date. The triangle mark having two vertices on the vertical line represents the key command for file playback such that the information entered with the triangle mark is recognized as a music file which is searched and executed according to the user's gesture input.

With continued reference to FIG. 11, the mail envelope mark represents the function related to character message to support activation of the character message function with the detection of the entry of the mail envelope mark, and, if there is information input together, the mail envelop emark supports to display a message composition screen using the information as the sender. The sandglass mark represents the key command related to the alarm function which is activated upon receipt of the gesture recognition information. If a certain numeral information is entered together with the sandglass mark, the terminal 100 controls to output an alarm when the time corresponding to the numeral information elapses.

The pigtail mark represents the gesture recognition information calling a dialer for telephony function. If a certain numeral or name information is input along with the pigtail mark, the terminal 100 may place a call to another terminal represented by the numeral or name information. The ribbon mark represents the gesture recognition information related to ebook content execution. If the ribbon mark is recognized as the gesture recognition information, the terminal 100 executes the ebook function. For example, the terminal 100 may control to display on the display panel 141 a list of the ebook contents stored in the storage unit 150. If a specific text or numeral information is input along with the ribbon mark, the terminal 100 searches for the ebook corresponding to the function support information and controls the display panel 141 to display the ebook content.

In addition, with further reference to FIG. 11, the text balloon mark represents the gesture recognition information for executing the function related to the chat function. If the text balloon mark is input, the terminal 100 activates the chat function. If a specific user name information is input along with the text balloon mark or a number related to a specific user terminal is input, the terminal 100 supports to perform the chat function for chatting with the user represented by the user name or the related number. The clip mark represents the gesture recognition information for executing the clipboard function. If the input gesture made with the touch pen 200 is recognized as the gesture recognition information of clip mark, the terminal 100 can insert the contents displayed on the display panel 141 to the clipboard automatically or call the clipboard. The star mark represents the gesture recognition information for executing the favorite contact list. If the input gesture made by the touch pen 200 is recognized as the gesture recognition information of the star mark, the terminal 100 can display a predefined favorite contact list on the display panel 141.

As described above, if the gesture recognition information corresponding to a key command is input, the terminal 100 may activate the function corresponding to the gesture recognition information. If the function support information is input along with the key command, the terminal 100 activates the corresponding function and performs a function based on the function support information.

Figure 12:
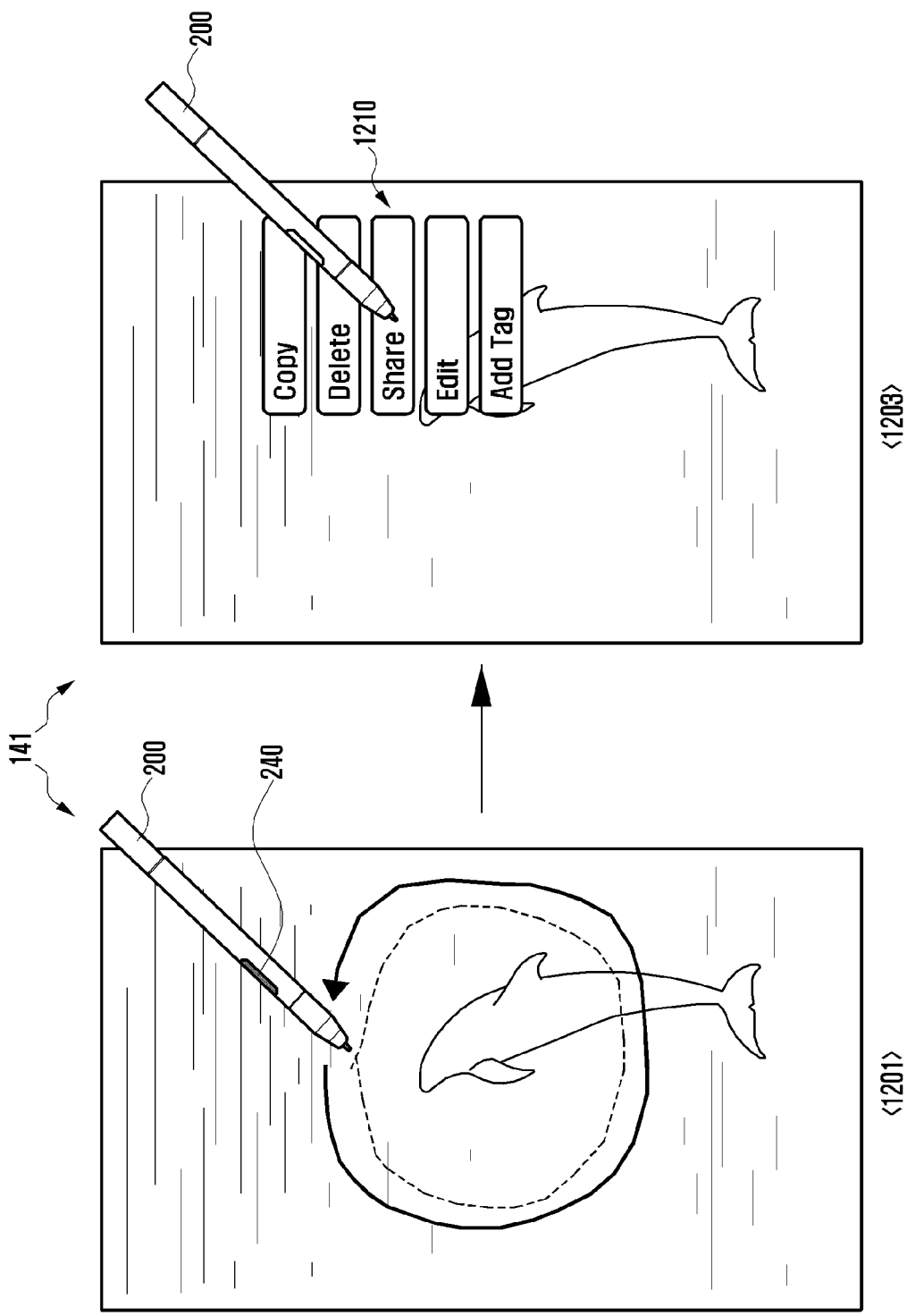
FIG. 12, FIG. 13 and FIG. 14 are diagrams illustrating operation of a pen function according to another embodiment of the present invention.
Figure 13:
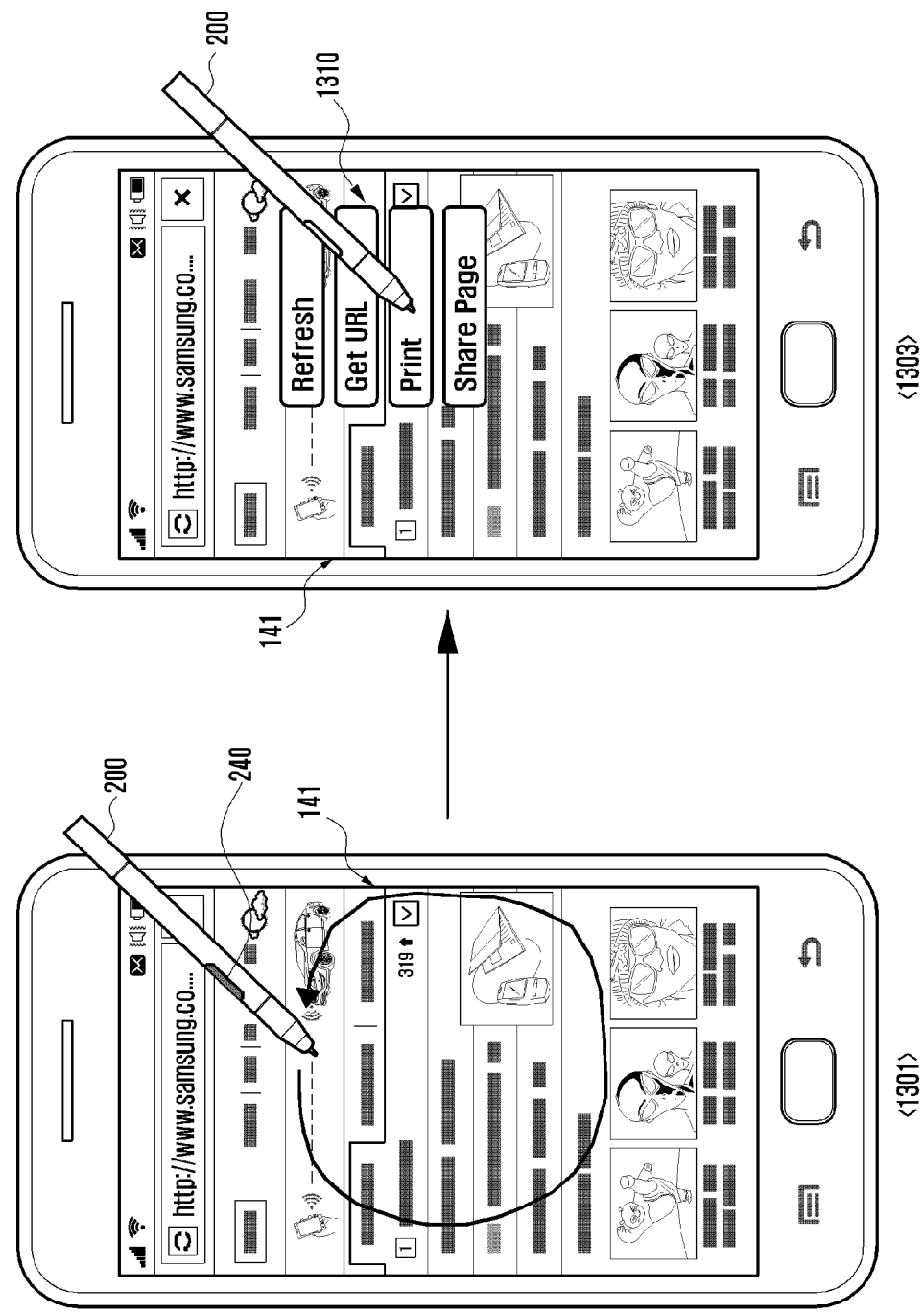
Figure 14:
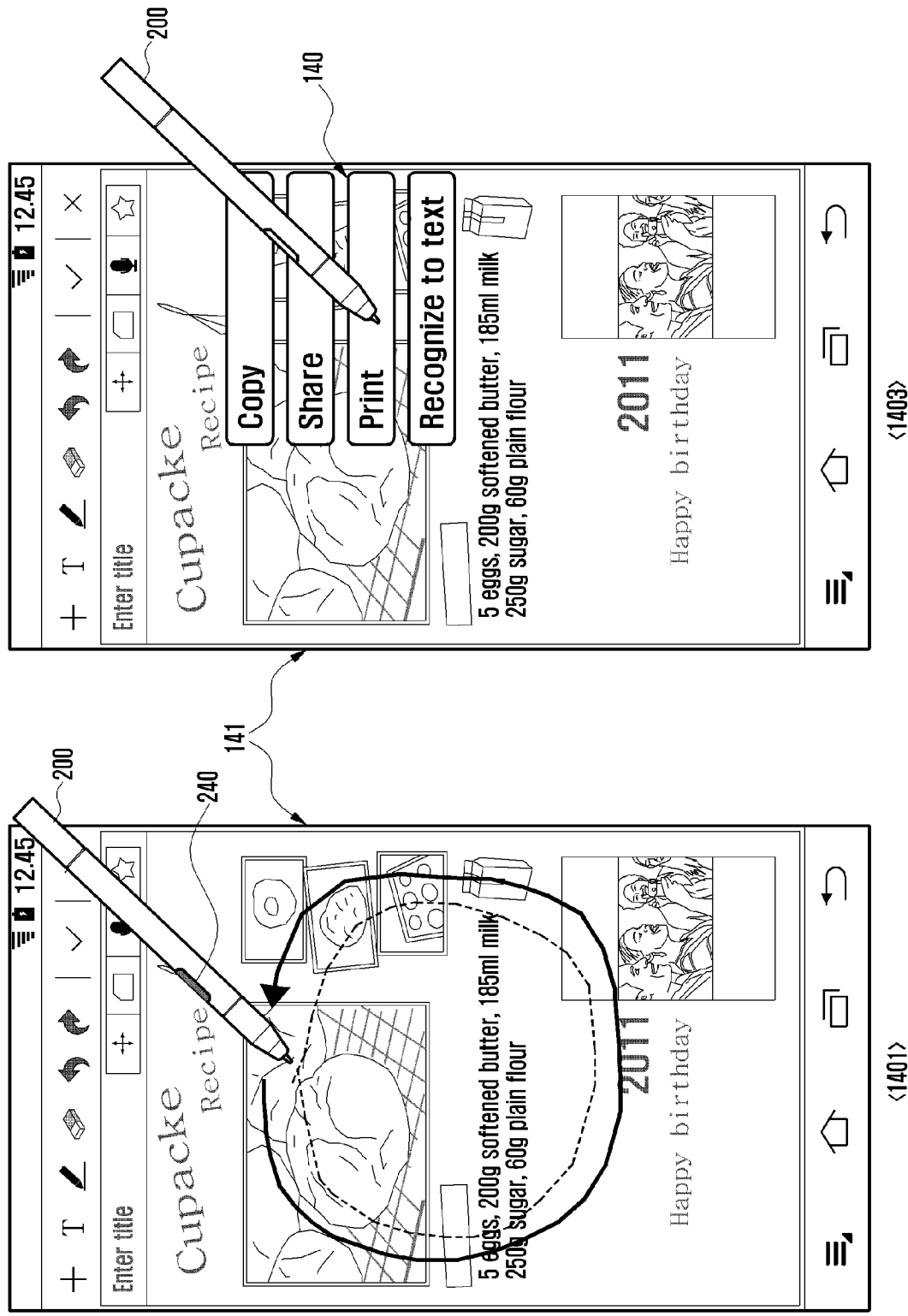

FIGS. 12, 13 and 14 are diagrams illustrating situations of making a pen function operation according to another embodiment of the present invention.

Referring now to FIG. 12, the terminal 100 displays a specific image or photo on the display panel 141 as shown in the screen 1201 according to the user manipulation or execution of a specific function. The terminal 100 can activate the pen recognition panel 143 to support operation of the pen function. In this state, the user may makes a specific input gesture with the touch pen 200 which is in the contact state or hover state to the display panel 141. At this time, the user may keep pushing the button 240 of the touch pen 200 or push and release the button 240 immediately.

Then the terminal 100 can collect the pen status information including whether any of the button 240 is pushed and whether the pen is in the contact or hovering state, the gesture recognition information corresponding to the gesture input operation, and the first function type information on the currently activated image or photo display function. The terminal 100 may search the pen function table 153 for the first pen function command mapped to the corresponding information.

In the gesture recognition information collection procedure, the terminal 100 can collect similar gesture recognition information corresponding to the gesture input operation. In other words, if a gesture input operation of drawing a closed curve similar to a circle is detected as in the drawing, the terminal 100 can judge the gesture recognition information as a circle. For example, the terminal 100 via the control unit 160 approximates the information input by the gesture input operation. In order to accomplish this approximation, the terminal 100 compares the gesture input operation with the predefined characters and figures to determine information corresponding to the gesture input operation as the gesture recognition information corresponding to characters or figures in a certain error range.

The terminal 100 can display the first option menu window 1210 as shown in the exemplary screen 1203 according to function execution corresponding to the first pen function command. The first option menu window 1210 may be the menu window designated for the currently activated function.

With reference to FIG. 13, the terminal 100 can also display a web access screen on the display panel 141 as shown in the screen 1301 of FIG. 13 according to the user manipulation or the execution of a specific function. Simultaneously, the terminal 100 may activate the pen recognition panel 143 for supporting the pen function operation. In this situation, the user may make a specific input gesture with the touch pen 200 in one of the contact and hovering states with the display panel 141 as shown in the drawing. Accordingly, the user may keep pushing the button 240 of the touch pen 200 comprised or push and release the button 240 at least one time, and possibly for a plurality of times. The specific input gesture may be the same gesture made as shown in FIG. 12.

With reference to FIG. 12 again, the terminal 100 may collect the same pen status information and gesture recognition information as shown and described in FIG. 12 and looks up the pen function table 153 in search of the second pen function command corresponding to the currently activated second function type information. If the second pen function command is retrieved, the terminal 100 executes the second pen function command to perform the corresponding function. In this case, the terminal 100 displays the second option menu window 1310 on the display panel 141 as shown in the screen 1303. The second option menu window 1310 may be the menu window designated for the web access function.

FIG. 14 shows screens for explaining the pen function operation in association with the memo function.

Now referring to FIG. 14, the terminal 100 may call the memo function according to the user manipulation and display previously stored specific memo information on the display panel 141 as shown in the screen 1401. In the case that the memory function is configured to support the pen function or an input signal for activating the pen function operation is generated, the terminal 100 activates the pen recognition panel 143 for the pen function operation. In this situation, the terminal 100 is capable of collecting the pen status information and pen gesture information according to the operation of the touch pen 200 as described with reference to FIGS. 12 and 13.

Then the terminal 100 identifies the third pen function command corresponding to the pen status information, pen gesture information, and function type information using the pen function table 153. If the third pen function command is identified, the terminal 100 executes the third pen function command to perform the corresponding function, e.g. displaying the third option menu window 1410, as shown in the screen 1403. Here, the third option menu window 1410 mapped to the third pen function command may be the menu window designated for the memo function.

As described above, the terminal 100 according to an embodiment of the present invention is capable of performing the function according the different pen function command in the case that the pen status information and pen gesture information are the same but the currently activated function type information is different.

Figure 15:
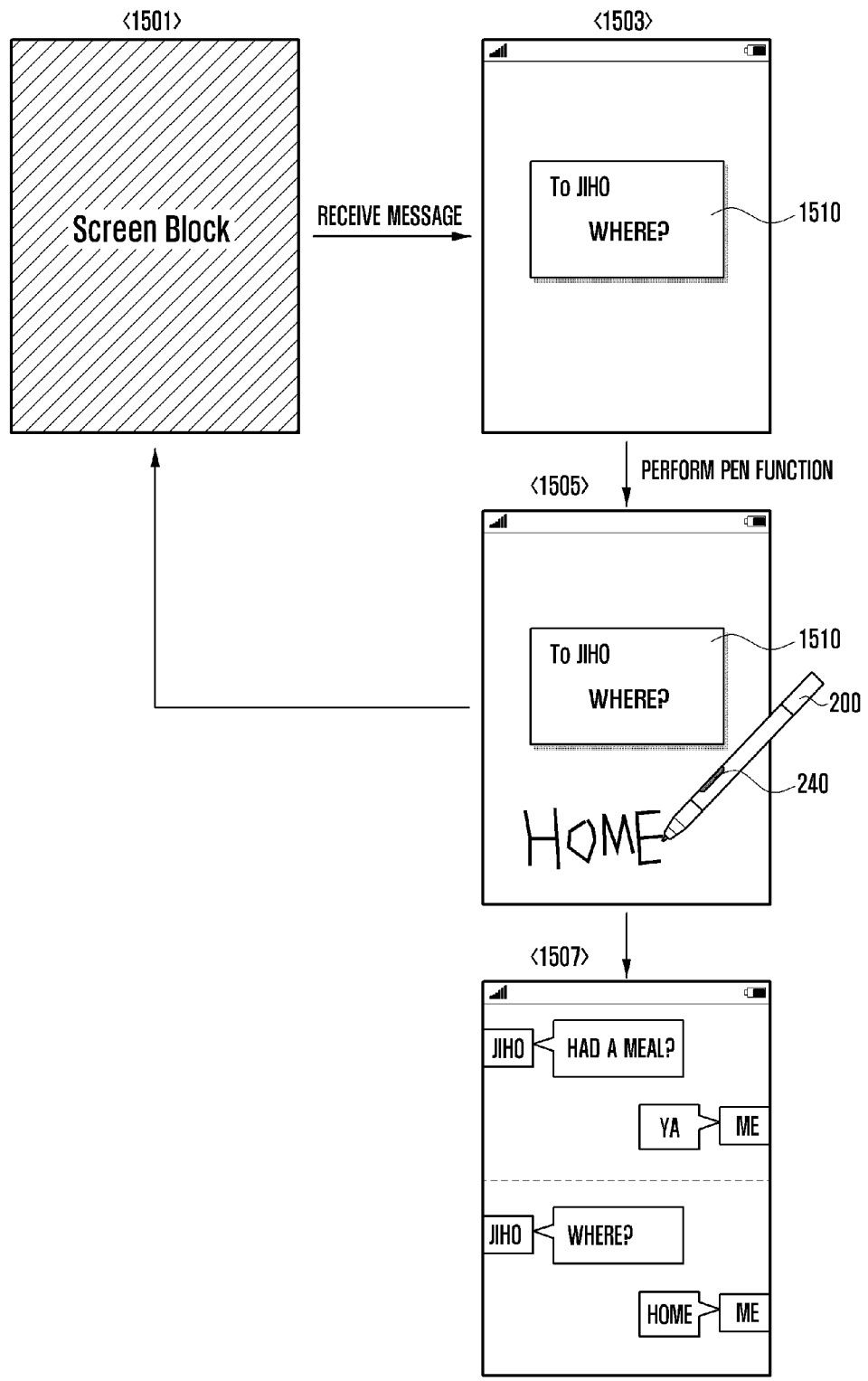
FIG. 15 is a diagram illustrating operation a chatting service by a pen function according to an embodiment of the present invention.

FIG. 15 is a diagram illustrating screens for illustrating the pen function operation according to an embodiment of the present invention.

Referring now to FIG. 15, if no input signal is detected or no function is executed in the power-on state, the terminal 100 blocks the power supply to the display panel 141 such that the screen is blacked out as shown in the screen 1501 (1501 being one of many ways the screen can be displayed. Although the screen 1501 shows the power-off state of the display panel 141, the communication unit 110 may be in the active state. Accordingly, if specific information is received through the communication unit 110 in the state of screen 1501, the display panel 141 is capable of displaying the received information. Here, the screen 1501 may be of the sleep state.

If a certain message is received by the communication unit 110 in the state of the screen 1501, the terminal 100 is capable of displaying the received message at a certain area of the display panel 141 as shown in the screen 1503. The received message may be displayed in an incoming message notifying area 1510 of the display panel 141. The incoming message notifying area 1510 may present a part of the received message. For example, the incoming message notifying area 1510 presents the message sender information and a part of the message transmitted by the sender.

In the case that the message notifying function is configured to support operation of the pen function, the user may make a text input with the touch pen as shown in the screen 1505. The terminal 100 via control unit 160 may recognize the information corresponding to the gesture input operation input from the touch pen 200 in the state that the incoming message notifying area 1510 is displayed on the display panel 141. The incoming message notifying area 1510 may be configured to disappear after certain time duration elapses after its appearance such that the pen function operation function is disabled after the disappearance of the incoming message notifying area 1510.

According to an embodiment of the present invention, the terminal 100 can adjust the display time duration of the incoming message notifying area 1510 for a certain purpose such as support of operation of the pen function. For this purpose, the terminal 100 can provide a menu screen for adjusting the display time duration of the incoming message notifying area 1510. The user may adjust the display time duration of the incoming message notifying area 1510 using the menu screen for adjusting the display time duration by considering the user's taste or corresponding to the user's ability to reply. Unless otherwise adjusted, the terminal 100 can define the display time duration of the incoming message notifying area 1510 according a predesigned method.

The screen 1505 is directed to the case where the user makes a writing input at an area out of the incoming message notifying area 1510 for replay in response to reception of the message. However, the present invention is not limited thereto, but the terminal 100 of the present invention can be configured to recognize the writing input made at a certain area of the display panel 141 during the display of the incoming message notifying area 1510 or in a predetermined time duration starting from the display of the incoming message notifying area 1510 as the reply to the incoming message. For example, the user may make an input gesture for writing the reply in the incoming message notifying area 1510.

With continued reference to FIG. 15, if the gesture recognition information corresponding to the input gesture for writing the reply is collected, the terminal 100 processes the collected gesture recognition information as the information corresponding to the received message. In more detail, if the user's reply writing input has been completed, the terminal 100 activates a function corresponding to the message reception through background processing. If the received message is a text message, the terminal 100 activates the text messaging function and extracts the sender information from the received message to transmit the reply message written with the gesture recognition information automatically.

If the received message is a chat message, the terminal 100 may control to activate the chat message function through the background processing. The terminal 100 can automatically transferring the gesture recognition information input while the incoming message notifying area 1510 is displayed as the reply message to the received chat message. In the procedure, the terminal 100 may control to open a chat room with the received chat message or present the received chat message and reply chat message in the chat room opened previously with the chat message sender.

The terminal 100 can also compose and transmit an email in reply to a received email in the same way as the text message service. In other words, if the received email is of requiring an immediate reply, the terminal 100 extracts the sender information from the received message displayed in the incoming message notifying area 1510 and sends an email including the gesture recognition information input by the user to the sender of the received email.

The reply input completion time can be determined when the touch pen 200 is lifted out of the recognition range from the display panel 141 or when a predetermined gesture, e.g. input of period, is detected. Alternatively, the terminal 100 can display a button map for receiving the reply writing completion on the display panel 141 when the writing input starts such that the user selects the button map to complete the writing input.

Once the reply transmission has been completed in the state of screen 1505 or if the reply input has been completed, the terminal 100 can redisplay screen 1501, or wakes up from the sleep state to check the message communication history, and display the message communication history as shown in the screen 1507. The screen 1507 may be displayed in different forms according to the type of the message. In other words, the screen 507 may be a text communication screen or a chat room screen.

Although the incoming message notifying area 1510 is assumed to be displayed in the sleep state in the above description, the present invention is not limited thereto. Moreover, the incoming message notifying area 1510 of the present invention may be displayed at an area of the display panel 141 in the state that a certain function is activated other than the sleep state without supplying power. As a result, the function of transmitting a reply in response to the incoming message notification can be applied to the situation of receiving incoming message in the active state as well as in the sleep state.

The operation of the pen function of the terminal 100 of the present invention supports to process the gesture recognition information input for the type of the a specific user function that is temporarily activated. Accordingly, when an incoming message notification is generated by the communication unit 110, the terminal 100 is capable of supporting an input function using the touch pen 200 immediately.

As described above, the operation of the pen function system and method according to an embodiment of the present invention is provided with the pen function table 153 is mapped to the operation of the touch pen 200 for the user to perform more various and convenient functions in situations where the touch pen 200 is used. Accordingly, terminal can perform various functions by associating at least one of the function type information on the currently activated function, pen status information with others, and combine gesture recognition information or use each of them independently.

The terminal 100 may further include various other modules depending on a configuration thereof. For example, if the terminal 100 is a communication terminal, there may be included other configurations which are not described above such as a short range communication module, a communication interface for supporting wired and/or wireless data communication of the terminal 100, an Internet communication module for supporting Internet access, a digital broadcast module for receiving and playing broadcast signal, etc.

Although it is almost impossible to list all the variations of components that may be used due to the trend of convergence of digital devices, the device may be configured to further include other components equivalent to the aforementioned components. The terminal 100 according to an embodiment of the present invention can be implemented without any of the aforementioned components depending on a configuration thereof or have other configuration. This will be easily understood by those skilled in the art.

According to an embodiment of the present invention, the terminal 100 can be any of all types of information communication devices and multimedia devices including mobile communication terminals operated by communication protocols corresponding to various communication systems, Portable Multimedia Player (PMP), digital broadcast player, Personal Digital Assistant (PDA), music player (e.g. MP3 player), game console, smartphone, notebook computer, handheld PC, etc. and applied devices thereof.

The apparatuses and methods of the disclosure can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor control unit or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

In addition, an artisan understands and appreciates that a "processor" or "microprocessor" comprises hardware in the claims. Under the broadest reasonable interpretation, the appended claims constitute statutory subject matter in compliance with 35 U.S.C. §101. The terms "unit" or "module" as used herein is to be understood under the broadest reasonable interpretation as constituting statutory subject matter under 35 U.S.C. §101 and does not constitute software per se. When a unit or module includes machine executable code it is to be understood that a non-transitory machine readable medium contains the machine executable code that is loaded into hardware such a processor, microprocessor or control unit for execution.

Although preferred embodiments of the invention have been described in the above description using the drawings, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A pen function method comprising:
    collecting information, by a control unit, comprising: pen status information including: information regarding an arrangement state between a pen recognition panel of a terminal that recognizes proximity of a touch pen, and recognizes the touch pen and a state information on whether a actuator of the touch pen activated, application type information on a currently activated application program, and a gesture recognition information according to a gesture input operation of the touch pen;
    identifying a pen function command corresponding to the collected information by accessing associated information in storage; and
    performing a function corresponding to the identified pen function command,
    wherein accessing of associated information in storage comprises accessing pen function table in the storage which maps the pen function command with the pen status information, the application type information and the gesture recognition information.

2. The method of claim 1, wherein the arrangement state, of the collected status information of an input device comprises at least one of a contact state information indicating that the input device is located within a first distance from the recognition panel, a hovering state information indicating that the input device is separated between the first distance and a second distance from the recognition panel that is further away from the recognition panel than the first distance, and an air state information indicating that the input device is located outside of the second distance from the recognition panel, actuator active state information indicating that an actuator has been activated; and actuator inactive state information indicating that the actuator is not active.

3. The method of claim 2, wherein performing a function comprises:
    performing a different function according to a same gesture recognition information input in the hovering state or input in the contact state; and
    displaying different option menu window for a same status information of the input device and gesture recognition information according to a function type information.

4. The method of claim 1, wherein collecting information comprises collecting a key command input by a gesture input operation of an input device and predefined for activating a certain function, and for performing a function comprises activating the function corresponding to the key command.

5. The method of claim 4, wherein collecting information comprises collecting a function support information which is input by the gesture input operation of the input device and applied to the function activated by the key command, and performing a function comprises applying the function support information to the activated function automatically.

6. The method of claim 1, wherein collecting information comprises recognizing, when a gesture input operation is generated in a predetermined time since receipt of notification information or message, the gesture input operation and collecting the gesture recognition information, and performing a function comprises transmitting the collected gesture recognition information as a response message to the notification information or an automatic message.

7. The method of claim 6, wherein performing the function includes displaying message history screen related to received and transmitted response messages.

8. The method of claim 6, further comprising supporting, before collecting information, a sleep state for blocking power supplied to a display panel or a screen display state for displaying a screen according to performing a certain function, wherein performing a function includes returning to the sleep state or previous screen display state automatic transmittance.

9. A method comprising:
    detecting a gesture input of an input device, the gesture is generated during at least one of a touch input or a hovering input;
    recognizing a first object and a second object from the gesture;
    collecting a key command for activating a specific function from the first object, and an input to the specific function from the second object;
    activating the function corresponding to the key command; and
    applying the input to the corresponding function.

10. The method of claim 9, further comprising displaying a virtual pad on a display panel for recognizing the gesture input of the input device.

11. The method of claim 9, wherein activating the function corresponding to the key command comprises at least one of:
    activating an alarm setting function corresponding to the key command and applying the input as an alarm time automatically for alarming;
    activating a file playback function corresponding to the key command and calling a file corresponding to the input information and playing the file automatically;

activating a planner function corresponding to the key command and displaying schedule information on a date corresponding to the input or entering schedule information on the date corresponding to the input automatically;

displaying an ebook content corresponding to the input together with the key command automatically; and performing computing with numerals and computing symbols input by the input together with the key command and outputting a result thereof.

12. An electronic device, the device comprising:
a recognition panel that recognizes an input device;
a control unit that collects:
  status is information of the input device including:
    information regarding an arrangement state between the recognition panel and the input device and a state information on whether a actuator of the input device is activated, application type information on a currently activated application program, and a gesture recognition information according to a gesture input operation of the input device;
a storage unit that stores a function table providing one or more function commands corresponding to the collected information, the function table maps the function commands with the status information, the application type information and the gesture recognition information; and
a display panel that displays information according to performing of a function corresponding to the function command of the one or more function commands.

13. The device of claim 12, wherein the status information of the input device comprises at least one of:
a contact state information indicating that the input device is located within a first distance from the recognition panel;
a hovering state information indicating that the input device is separated between the first distance and a second distance that is further from the recognition panel than the first distance;
an air state information indicating that the input device is located outside of the second distance from the recognition panel;
active actuator state information indicating that an actuator arranged on the input device is activated; and
inactive actuator state information indicating that the actuator arranged on the input device is inactive, and the control unit controls to perform different function according to the gesture,
wherein recognition of information input in the hovering state, or the gesture recognition information input in the contact state causes the display panel to a display different option menu window for a same status information of the input device and gesture recognition information according to the function type information.

14. The device of claim 12, wherein the control unit activates a function corresponding to a key command when the gesture recognition information is collected corresponding to the key command input by the input operation of the input device and predefined for activating a certain function.

15. The device of claim 14, wherein the recognition panel collects a function support information that is input by the gesture input operation of the input device and applied to the function activated by the key command, and the control unit automatically applies the function support information to the activated function.

16. The device of claim 12, further comprising a communication unit that receives notification information or a message, wherein the recognition panel collects gesture recognition information corresponding to the input operation in a predetermined time measure from a receipt of the notification information or message, and the control unit controls automatically transmitting the collected gesture recognition information as a response message in response to the notification information or message information.

17. The device of claim 16, wherein the display panel displays a message history screen related to the received and transmitted response messages.

18. The device of claim 16, wherein the display panel displays a power-off state screen in a sleep state or a specific function execution screen, and the control unit controls returning of the display panel to the sleep state or previous screen display state automatically after automatic transmission.

19. An electronic device, the device comprising:
a recognition panel for detecting a gesture of an input device during at least one of a touch input or a hovering input; and
a control unit configured to:
recognize a first object and a second object form the gesture;
collect a key command for activating a specific function from the first object and an input to the specific function from the second object;
activate the function corresponding to the key command; and
apply the input to a corresponding function.

20. The device of claim 19, wherein the control unit is further configured to activate a message function according to collection of the first object indicating a message function and entering the second object as message recipient information of the message function automatically.

21. The device of claim 19, wherein the control unit is further configured to control to input a second object input together according to collection of the first object indicating a search function as a search keyword and controls an automatic search based on the keyword.

22. The device of claim 19, wherein the control unit is further configured to activate a telephone function according to collection of the first object indicating a particular telephony function and places a call to a recipient phone number to that the second object is applied.

* * * * *

UNITED STATES PATENT AND TRADEMARK OFFICE
CERTIFICATE OF CORRECTION

PATENT NO. : 9,632,595 B2  
APPLICATION NO. : 13/960438  
DATED : April 25, 2017  
INVENTOR(S) : Hyunmi Park et al.

Page 1 of 1

It is certified that error appears in the above-identified patent and that said Letters Patent is hereby corrected as shown below:

In the Claims

Column 23, Claim 1, Line 53 should read as follows:  
--...comprises accessing a pen function...--

Column 23, Claim 2, Lines 57-58 should read as follows:  
--...arrangement state of the...--

Column 25, Claim 12, Line 14 should read as follows:  
--...status information of the input...--

Signed and Sealed this  
Thirtieth Day of May, 2017

Michelle K. Lee  
*Director of the United States Patent and Trademark Office*